(12) United States Patent
Cessna et al.

(10) Patent No.: US 11,425,250 B1
(45) Date of Patent: Aug. 23, 2022

(54) ARTIFICIAL INTELLIGENCE BASED CALL HANDLING OPTIMIZATION

(71) Applicant: Intuit Inc., Mountain View, CA (US)

(72) Inventors: Joseph Brian Cessna, Weston, WI (US); Yaxian Li, Fremont, CA (US); Linxia Liao, Palo Alto, CA (US); Kenneth Grant Yocum, San Diego, CA (US); Nicholas R. Johnson, Tucson, AZ (US); Christiana Mei Hui Chen, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/543,453

(22) Filed: Dec. 6, 2021

(51) Int. Cl.
*H04M 3/00* (2006.01)
*H04M 3/523* (2006.01)

(52) U.S. Cl.
CPC ................ *H04M 3/5232* (2013.01)

(58) Field of Classification Search
CPC .................. H04M 3/5232; H04M 3/5233
See application file for complete search history.

(56) References Cited

U.S. PATENT DOCUMENTS

| | | | |
|---|---|---|---|
| 8,300,798 B1 * | 10/2012 | Wu .................. | H04M 3/5233 379/265.14 |
| 8,971,520 B1 * | 3/2015 | Bryce .............. | H04M 3/5233 379/265.11 |

* cited by examiner

*Primary Examiner* — Rasha S Al Aubaidi
(74) *Attorney, Agent, or Firm* — Paradice and Li LLP

(57) ABSTRACT

Systems and methods for call handling optimization of a call center are disclosed. A system is configured to: obtain a plurality of agent demand variables; obtain an indication of available agents that are associated with a plurality of skills; generate a multi-skill routing matrix depicting a routing problem from the agent demand variables and the available agents; deconstruct the multi-skill matrix into one or more band routing matrices; and identify, for each band routing matrix, a number of agents from the available agents to be used in solving the band routing matrix. Identifying the number of agents includes recursively simulating a plurality of possible routing solutions, measuring a quality metric for each simulation, and reducing the range of available agents based on the quality metric. The system may indicate the number of agents to be used for each routing sub-problem (which may be at the staff group level).

20 Claims, 11 Drawing Sheets

ARTIFICIAL INTELLIGENCE BASED CALL HANDLING OPTIMIZATION

TECHNICAL FIELD

This disclosure relates generally to using artificial intelligence in optimizing call handling, including using artificial intelligence to optimize resources for the handling of incoming calls.

DESCRIPTION OF RELATED ART

Various call centers exist to handle communications from users. For example, financial institutions, such as banks, include or contract with one or more call centers to handle potential or existing customers' needs. A bank customer may call the bank's call center to handle a travel alert, a payment by phone, a query regarding a recent purchase, applying for a loan, or other customer requests. In another example, a company providing a software product, a software service (such as software as a service (SaaS)), or other technical products to be used by customers may include or contract with one or more call centers to handle questions from the customers. A company's customer may call the company's call center for technical assistance in using one or more portions of the company's product, for billing or subscription assistance, or for other customer needs.

The institution including or contracting with a call center desires the call center to handle incoming user calls as efficiently as possible, providing satisfactory assistance to a user in the shortest amount of time. However, a call center includes many logistics to be managed, such as varying agent availability, varying agent expertise, and varying volume of user calls on a varying diversity of topics. As such, there is a need to optimize call center resources for the handling of user calls into the call center.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for call handling optimization using an artificial intelligence (AI) model. The method includes obtaining a plurality of agent demand variables. The method also includes obtaining an indication of a plurality of available agents associated with a plurality of skills, with at least one of the plurality of available agents being associated with multiple skills of the plurality of skills. The method further includes generating, from the plurality of agent demand variables and the indication of the plurality of available agents, a multi-skill routing matrix depicting a routing problem for routing user calls to one or more available agents of the plurality of available agents, with each user call being associated with a skill of the plurality of skills. The method also includes deconstructing the multi-skill matrix into one or more band routing matrices depicting one or more routing sub-problems for routing at least a portion of the user calls to the one or more available agents. The method further includes identifying, for each of the one or more band routing matrices, a number of agents from the plurality of available agents to be used in solving the band routing matrix. The identification includes recursively: simulating each of a plurality of possible routing solutions for the band routing matrix based on the plurality of agent demand variables (with each possible routing solution being associated with a different combination of candidate agents from a range of available agents); measuring a quality metric for each simulation; and reducing the range of available agents based on the quality metric until the range of available agents converges to a number of agents to be used in solving the band routing matrix. The method also includes providing, for each of the routing sub-problems, an indication of the number of agents to be used as a solution to the routing sub-problem. The number of agents as a solution may be provided at a staff group level of the agents.

Another innovative aspect of the subject matter described in this disclosure can be implemented in a system for call handling optimization using an AI model. An example system includes one or more processors and a memory storing instructions that, when executed by the one or more processors, cause the system to perform operations. The operations include obtaining a plurality of agent demand variables. The operations also include obtaining an indication of a plurality of available agents associated with a plurality of skills, with at least one of the plurality of available agents being associated with multiple skills of the plurality of skills. The operations further include generating, from the plurality of agent demand variables and the indication of the plurality of available agents, a multi-skill routing matrix depicting a routing problem for routing user calls to one or more available agents of the plurality of available agents, with each user call being associated with a skill of the plurality of skills. The operations also include deconstructing the multi-skill matrix into one or more band routing matrices depicting one or more routing sub-problems for routing at least a portion of the user calls to the one or more available agents. The operations further include identifying, for each of the one or more band routing matrices, a number of agents from the plurality of available agents to be used in solving the band routing matrix. The identification includes recursively: simulating each of a plurality of possible routing solutions for the band routing matrix based on the plurality of agent demand variables (with each possible routing solution being associated with a different combination of candidate agents from a range of available agents); measuring a quality metric for each simulation; and reducing the range of available agents based on the quality metric until the range of available agents converges to a number of agents to be used in solving the band routing matrix. The operations also include providing, for each of the routing sub-problems, an indication of the number of agents to be used as a solution to the routing sub-problem. The number of agents as a solution may be provided at a staff group level of the agents.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Implementations of the subject matter described in this disclosure may be used for the optimization of call handling. In particular, systems and methods of using an artificial intelligence (AI) model to optimize call center resources for the handling of calls into the call center are described. For example, systems and methods for identifying a needed number of call center agents to handle incoming user calls are described.

A call center employs a plurality of agents trained in one or more aspects of a company in order to handle questions or requests received from user calls. The call center includes an incoming call interface to handle a large number of incoming user calls at one time, and the call center routes the incoming user calls to the plurality of agents in a defined manner. As used herein, a user may refer to any person or entity that may interact with the call center, such as a customer of a company associated with the call center, a user of a product from a company associated with the call center, an agent calling on behalf of a customer or user, and so on. While the term "call" is used for simplicity, as used herein, "call" may refer to any suitable user contact with a center for handling such. For example, "call" may refer to telephone calls, voice over internet protocol (VoIP) calls, live text chat sessions, or live audio or audio and video sessions. As such, a "call center" as used herein may refer to any suitable center of agents to interact with the users via a suitable interface to handle user requests.

A sufficient group of agents needs to be available to handle incoming user calls in order to ensure a specific service level is met. In particular, the specific number of agents to be working at any given time needs to be sufficient to handle incoming user calls in a satisfactory manner. To determine how many agents are needed, the number of user calls to be received needs to be predicted. In terms of supply and demand, the demand for agents in a call center needs to be forecast before the supply of agents to be provided can be determined.

Figure 1:
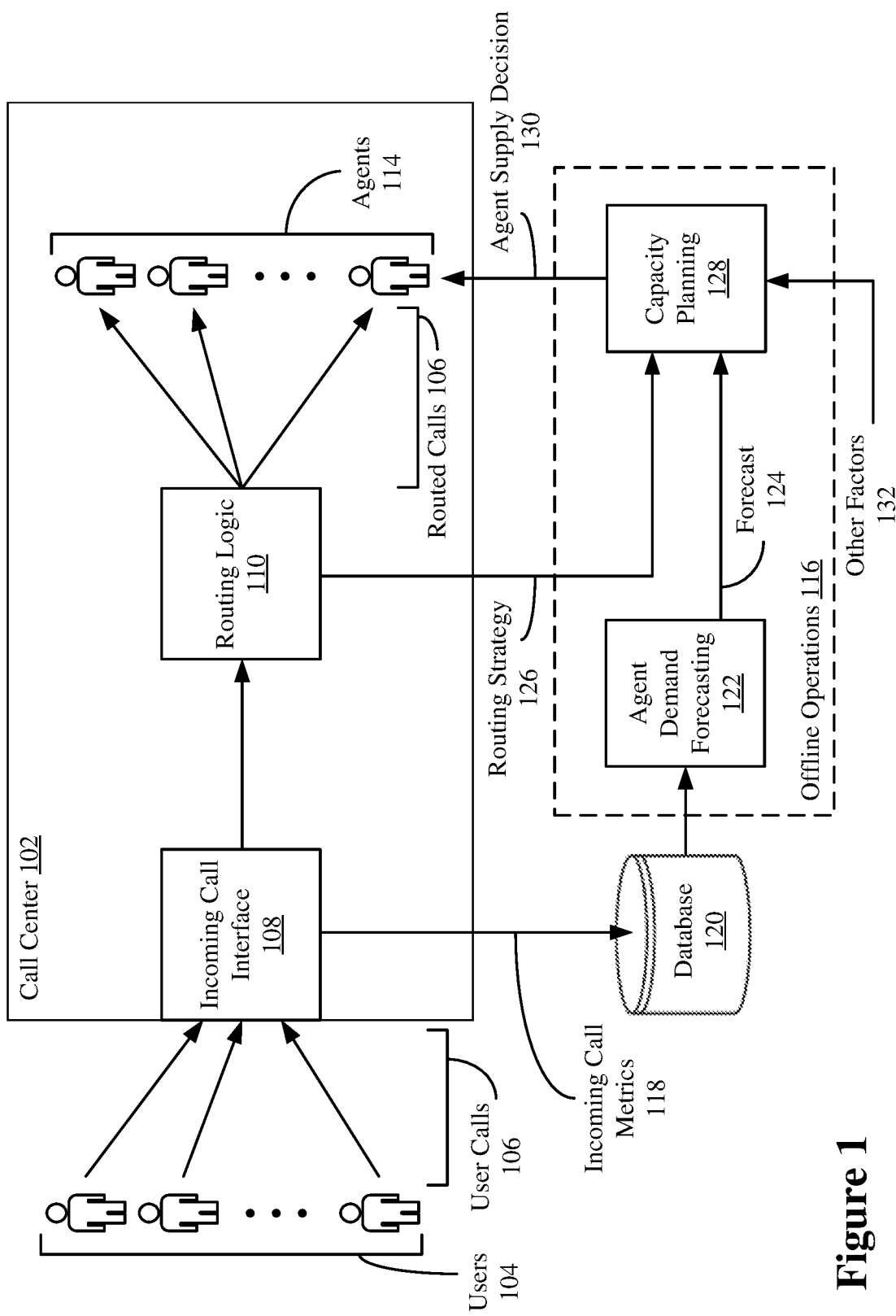
FIG. 1 shows an example block diagram of a call center to handle user calls.

FIG. 1 shows an example block diagram 100 of a call center 102 to handle user calls 106 from a plurality of users 104. As shown, a plurality of users 104 may make user calls 106 at different times to the call center 102. For example, telephone calls may be made over a publicly switched telephone network (PSTN) or chat session may be initiated via a web browser or smartphone application at different times throughout the day by the users 104. The incoming calls are received by an incoming call interface 108 of the call center 102. For example, the incoming call interface 108 may include an automatic switch board or automatic chat client to ingest provide the incoming calls on a first come basis to the routing logic 110. While not shown the incoming calls may be queued in a first in first out (FIFO) manner to be provided to the routing logic 110.

The routing logic 110 is able to route the calls to any of the agents 114 that are available at that moment. For example, agents may be situated in work stations within the call center, and each work station may include a telephone, a computer, or other means to interact with a user 104. The routing logic 110 may be coupled to the telephone, computer, etc. to route a user call to an appropriate agent 114. The routing logic 110 may include any suitable components for routing the user calls to the agents 114. For example, the routing logic 110 may include hardware and software to route the user calls based on a defined routing strategy 126. The routing strategy may be based on specific requirements from the company or entity employing the call center (such as a maximum or average hold time allowed or other service level objectives (SLOs)), cost information (such as the financial cost of an agent working), an occupancy associated with an agent (such as how long an agent is to rest between handling calls), or other constraints associated with the call center. Based on the routing strategy, the routing logic 110 determines to which agents 114 calls are to be routed and provides the routed calls 106 to the appropriate agents 114. While the agents 114 are depicted as being situated at the call center 102, the agents may be situated at any place coupled to the routing logic 110. For example, agents 114 may be at home, in remote offices, or otherwise outside of the call center, and the routing logic 110 may use the internet or the PSTN to provide the routed calls 106 to the agents 114.

The number of agents 114 to be working at one time needs to be capable of handling the demand from the incoming user calls 106 in a satisfactory manner. In a simplified example, if 2,000 calls are received per hour and an agent is able to handle 10 calls per hour, 200 agents are needed. However, user calls may surge at specific times of day (such as between the hours of 5 pm and 8 pm on weekdays after many people come home from work) and may ebb at other times of day (such as between the hours of 12 am and 5 am when many people are sleeping). In addition, temporary surges in the number of user calls may occur in a random manner. As such, offline operations 116 are to be performed to determine which agents are to be working. For example, agent demand needs to be forecasted (such as via the agent demand forecasting module 122) and capacity planning needs to be performed based on the forecast (such as via the capacity planning module 128) to decide which agents 114 are to be working at a specific time (agent supply decision 130).

Regarding agent demand forecasting and capacity planning, future demand may be predicted based on metrics regarding previous incoming calls. As such, incoming call metrics 118 from the incoming call interface 108 (or from the routing logic 110) may be stored in a database 120 for use in predicting agent demand. Example incoming call metrics 118 may include the number of user calls received during an amount of time (such as every six minutes, ten minutes, hour, or another suitable interval), the maximum number of user calls being handled by the call center at one time, average number of user calls received, maximum surges in user calls observed, and so on. The agent demand forecasting module 122 uses the incoming call metrics 118 stored over time to predict the volume of user calls (which may be included in forecast 124 from the agent demand forecasting module 122). The capacity planning module 128 uses the demand forecast 124 and the routing strategy 126 (from the routing logic 110 to route the user calls) to identify the number of agents needed (shown as agent supply decision 130). The capacity planning module 128 may also use other factors 132 (such as the herein noted agent demand variables, which may include call center constraints, agent constraints, and so on) in generating the agent supply decision 130. The agent supply decision 130 is used to determine and staff the agents 114 needed to handle the user calls 106.

Various means are used to identify the number of agents needed for simpler forecasting problems. For many simple solutions, each of the agents have the same skill set and are able to handle any user call. However, in practice, agents 114 may have different skill sets and be segmented into different business groups that handle different types of user requests. For example, a bank's call center may handle requests or concerns regarding all aspects of the bank's business. For example, the call center may handle requests or concerns for various business departments from online banking, to credit cards, to fraud protection, to loan repayments, to mortgage applications, to investment accounts, and so on. An agent may have specific skills (such as specific training and tools) to handle calls for one department or for multiple departments while being unable to handle calls for other departments. For example, an agent handling user calls regarding mortgage applications may not be suited to handle user calls regarding online banking. As used herein, a "skill" may refer to an agent being able to handle a specific type of user call. Various means are used to identify the number of agents needed based on call volume and each agent having one specific skill (such as being able to handle one type of user call).

One problem with existing means, though, is that the means are unable to or inefficiently determine the number of agents needed when agents have multiple skills (such as being able to handle more than one type of user call). For example, for a bank call center, if an agent is able to handle user calls regarding mortgages, is able to handle user calls regarding car loans, and is able to handle user calls regarding personal loans, capacity planning may assume the agent is restricted to a specific skill (such as being able to handle car loans) without taking into account the agent's other skills (such as being able to handle other types of loans or mortgages). Limiting the skill set of agents in the problem formulation to decide the number of agents working places an unnecessary restriction on the problem being solved. Without accounting for the various skill sets of the agents, the answer of the number of agents needed may be suboptimal. As such, what is needed is a system to account for agents having multiple skills in optimizing. In addition, some form of artificial intelligence is needed in automatically formulating and solving the problem of the number of agents to be working in order to solve the problem in a satisfactory amount of time before staffing decisions are to be made.

Various implementations of the subject matter disclosed herein provide one or more technical solutions to the technical problem of optimizing the number of agents in a call center working to handle incoming user calls. In some implementations, a computing system is configured to obtain a plurality of agent demand variables (such as a user call volume forecast, an average handle time (AHT) forecast for user calls, a defined user call routing strategy, one or more call center constraints (such as average wait time, minimum or maximum number of agents, agent occupancy, or a minimum service level objective (SLO) requirement), cost information associated with an agent, and other factors affecting demand for agents to handle incoming user calls). The system is also configured to obtain an indication of a plurality of available agents that are associated with a plurality of skills (such as which agents are available and have which skills). At least one of the plurality of available agents is associated with multiple skills of the plurality of skills. The computing system is configured to generate, from the plurality of agent demand variables and the indication of the plurality of available agents, a multi-skill routing matrix depicting a routing problem for routing user calls to one or more available agents of the plurality of available agents. To be able to handle agents being associated with a plurality of skills, the computing system is configured to deconstruct the multi-skill matrix into one or more band routing matrices depicting one or more routing sub-problems and identify a number of agents to be used for each of the one or more band routing matrices. Identifying the number of agents for a band routing matrix includes recursively simulating each of a plurality of possible routing solutions (such as different subsets of agents) for the band routing matrix, measuring a quality metric for each simulation (such as projected AHT, average hold time, or another metric related to the quality of the simulated call), and reducing the range of available agents for the band routing matrix based on the quality metric until the range converges to an answer for the band routing matrix. The computing system is configured to determine the solution to the routing problem depicted by the multi-skill routing matrix by providing the number of agents to be used as a solution to each routing sub-problem. The number of agents indicated may be at a staff group level of the agents. In this manner, an overall solution to the routing problem may be an aggregation of the number of agents across the one or more band routing matrices (such as indicating the number of agents needed for each staff group), and the computing system may be configured to provide the overall solution for the routing problem along with the solutions for the routing sub-problems for use in scheduling which agents are to be used.

Various aspects of the present disclosure provide a unique computing solution to a unique computing problem that did not exist prior to automatically processing large amounts of data (such as millions of incoming call metrics) in a short amount of time that cannot be performed manually. As such, implementations of the subject matter disclosed herein are not an abstract idea such as organizing human activity or a mental process that can be performed in the human mind. For example, hundreds, thousands, or more simulations of multiple large routing matrix problems to converge to an optimum set of resources to be used cannot be performed in the human mind in a required amount of time, much less using pen and paper.

Referring back to FIG. 1, a system may be configured to perform the operations of one or both of the agent demand forecasting module 122 and the capacity planning module 128. For example, the system may include the database 120, the agent forecasting demand module 122 (which may be embodied in hardware and/or software), and the capacity planning module 128 (which may be embodied in hardware and/or software). As such, the system may generate the agent supply decision 130. As noted above, the agent forecasting demand module 122 may be configured to predict future call volume to the call center 102. The agent forecasting demand module 122 may also predict the agent skills required for the predicted call volume. Regarding the output from the capacity planning module 128, in addition to the agent supply decision 130 including an indication of a total number of agents needed, the agent supply decision 130 may also include specifically which agents or which agent skills are to be included in the total number of agents to handle forecasted call demand. The number of agents and specific agent skills needed (which may be indicated as a specific set of agents having specific agent skills) may be used by the capacity planning module 128 to also include an optimized staffing daily schedule, an optimized seasonal workforce staffing plan, and other helpful directives regarding agent staffing in the agent supply decision 130.

Figure 2:
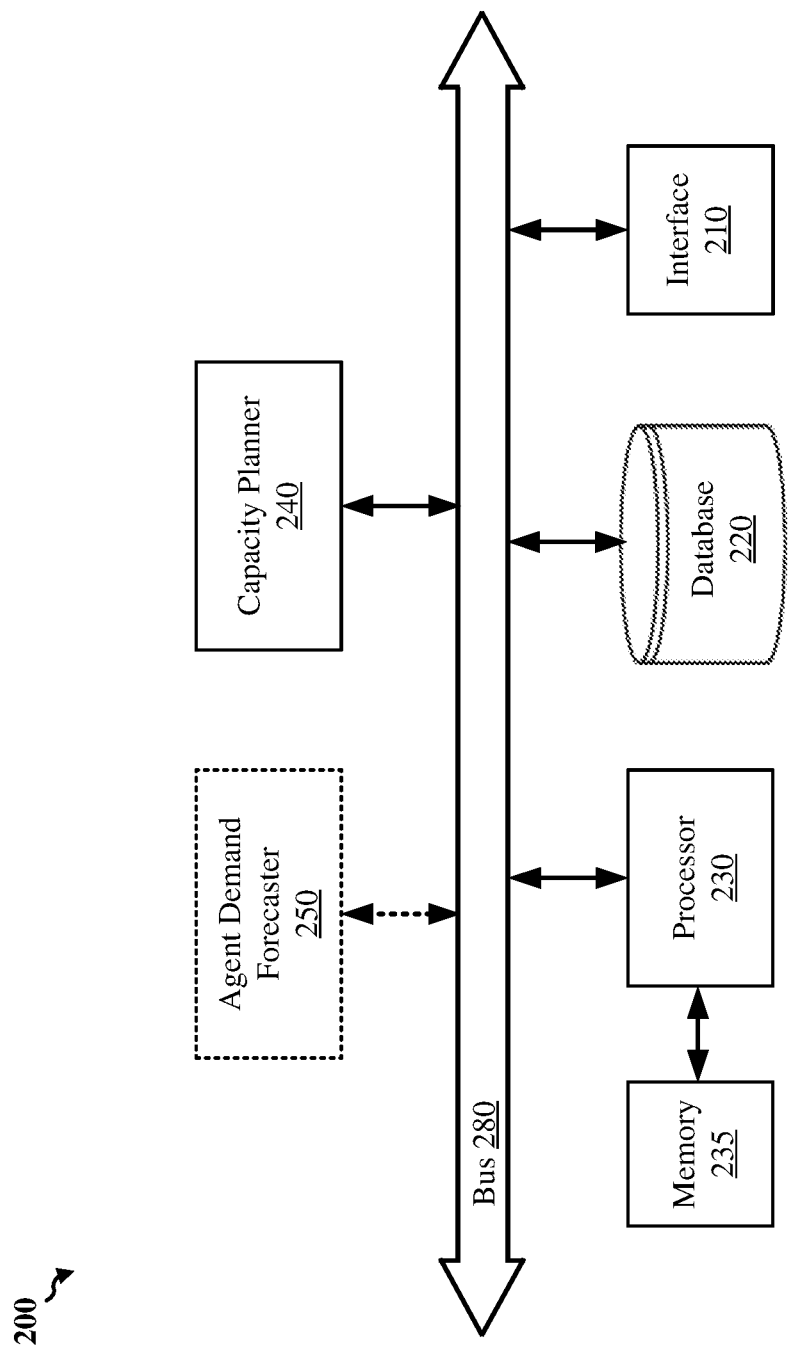
FIG. 2 shows an example system to optimize call center resources for user call handling.

FIG. 2 shows an example system 200 to optimize call center resources for user call handling. In some implementations, the system 200 generates the agent supply decision 130 indicating the agents needed to handle the forecasted user calls to be received by the call center. As noted above, the agent supply decision 130 may also include an optimized daily staffing schedule, a seasonal workforce staffing plan, or other staffing requirement information. The system 200 includes an interface 210, a database 220, a processor 230, a memory 235 coupled to the processor 230, and a capacity planner 240. The system 200 may also include an agent demand forecaster 250. In some implementations, the various components of the system 200 may be interconnected by at least a data bus 280, as depicted in the example of FIG. 2. In other implementations, the various components of the system 200 may be interconnected using other suitable signal routing resources.

The interface 210 may be one or more input/output (I/O) interfaces to obtain incoming user call information (such as incoming call metrics 118). The interface 210 may also obtain the routing strategy or other information (such as the other factors 132 in FIG. 1 or an indication of which agents are available for staffing) needed to generate the routing problem to be solved in generating the agent supply decision. If the agent demand forecaster 250 is not included in the system 200 and the forecast regarding future user call volume is determined outside of the system 200, the interface 210 may be configured to obtain the forecast regarding future user call volume. The interface 210 may also provide the agent supply demand to another device (such as to automatically output the staffing schedules) or for output to a user (such as printing or displaying an optimum staffing schedule).

An example interface may include a wired interface or wireless interface to the internet or other means to communicably couple with other devices. For example, the interface 210 may include an interface with an ethernet cable or a wireless interface to a modem, which is used to communicate with an internet service provider (ISP) directing traffic to and from other devices. In another example, a wired or wireless interface may connect the system 200 to another device over a device to device link or in an intranet. If the agent demand forecaster 250 is included in the system 200, the interface 210 may include a wired or wireless interface to couple to an incoming call interface or routing logic of the call center to obtain the incoming call metrics to be used by the agent demand forecaster 250 to generate a forecast. If the agent demand forecaster 250 is not included in the system 200, the interface 210 may include a wired or wireless interface to couple to a device implementing the agent demand forecaster in order to obtain the forecasts generated at the device. As noted above, the interface 210 may also be configured to provide an indication of the agent supply decision to a local user of the system 200. For example, the interface 210 may include a display, a speaker, a mouse, a keyboard, a printer, or other suitable input or output elements that allow interfacing with the user to provide the information to the user.

The database 220 may store one or more of the incoming call metrics for a history of user calls to the call center (which may be obtained by the interface 210), the forecasts generated by the agent demand forecaster 250 or obtained by the interface 210, one or more routing problems generated by the capacity planner, the routing strategy, agent demand variables, or an indication of available agents for staffing. The database 220 may also store one or more agent supply decisions from the capacity planner 240. In some implementations, the database 120 may include a relational database capable of presenting information as data sets in tabular form and capable of manipulating the data sets using relational operators. The database 220 may use Structured Query Language (SQL) for querying and maintaining the database 220.

The processor 230 may include one or more suitable processors capable of executing scripts or instructions of one or more software programs stored in system 200 (such as within the memory 235). For example, the processor 230 may be capable of executing one or more applications and the capacity planner 240. The processor 230 may also be capable of executing the agent demand forecaster 250. The processor 230 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 230 may include a combination of computing devices (such as a combination of a DSP and a microprocessor, a plurality of microprocessors, one or more microprocessors in conjunction with a DSP core, or any other such configuration).

The memory 235, which may be any suitable persistent memory (such as non-volatile memory or non-transitory memory) may store any number of software programs, executable instructions, machine code, algorithms, and the like that can be executed by the processor 230 to perform one or more corresponding operations or functions. For example, the memory 235 may store the one or more applications and the capacity planner 240 that may be executed by the processor 230. If the system 200 includes the agent demand forecaster 250, the memory 235 may also store the agent demand forecaster 250 that may be executed by the processor 230. The memory 235 may also store any data stored in the database 220 before or after processing by the processor 230. For example, the memory may obtain the incoming call metrics, the forecasts, or other information needed to generate the forecasts or to generate the agent supply decision. After performing operations by the processor 230, the output of the operations is provided by the processor 230 to the memory 235, and the output is then provided from the memory 235 to the database 220. In some implementations, hardwired circuitry may be used in place of, or in combination with, software instructions to implement aspects of the disclosure. As such, implementations of the subject matter disclosed herein are not limited to any specific combination of hardware circuitry and/or software.

If the system 200 includes the agent demand forecaster 250, the agent demand forecaster 250 generates forecasts regarding future user calls to the call center. For example, metrics regarding a history of user calls to a call intake system of the call center over a period of months or years may be obtained by the interface 210 and stored in the database 220, and the agent demand forecaster 250 may generate a forecast of user calls for a future day (such as for the next day or for a day during the next week) or for another suitable amount of time (such as an hour, an 8 hour shift, and so on). The history of the user calls may include any number of incoming call metrics. For example, in addition to the volume of calls received at a given time, the metrics may include the types of user calls received (and thus the agent skill needed), hold times, handle times, or other information regarding the user calls. For the specific agent skills needed for the received user calls, the call intake system of the call center may determine, for each user call, a type of the user call and thus the agent skill required to handle the user call. For example, an automatic switchboard operator (which may include a voice dialogue application) or an automated chat client may be used for the user to indicate the agent skill needed (such as a specific business department of the company or the type of user request to be handled) before routing the user call to a specific agent. In this manner, each user call may be associated with one or more incoming call metrics to be stored in the database 220 that include the agent skill required.

From the one or more incoming call metrics, the agent demand forecaster 250 may generate one or more forecasts for a defined time period. For example, the agent demand forecaster 250 may generate one or more forecasts daily for the next day or may generate one or more forecasts for a period of time defined by a local user of the system 200. The one or more forecasts may include a user call volume forecast. The user call volume forecast may indicate the predicted number of user calls to be received and the agent skills required for such user calls. For example, the user call volume forecast may include a specific agent skill required for each user call of the predicted number of user calls. The user call volume forecast may be in any suitable computer-readable format, such as one or more JavaScript Object Notation (JSON) files or objects. A visual representation of a simplified example of a user call volume forecast is depicted in Table 1 below:

TABLE 1

| User Call | Agent Skill Needed |
| --- | --- |
| 1 | X |
| 2 | Y |
| 3 | Z |
| 4 | Q |
| 5 | R |
| 6 | S |

The user calls 1-6 may only be tags to identify the different predicted user calls and not necessarily the order at which the user calls are received. The agent skills X, Y, Z, Q, R, and S may be any suitable agent skill. For example, for a company providing a software service, the agent skills may include technical support, billing support, vendor support, or subcategories within each type of support. In some implementations, the agent skills may be binned into one or more business departments responsible for handling specific types of user requests. While only six predicted user calls are depicted, it is to be understood that a large number of predicted user calls may exist, such as thousands or tens of thousands of predicted user calls. For much of the description herein in describing the routing problem, each of user calls 1-6 indicate one or more user calls needing a specific agent skill that may be received by a call center and are routed to agents 1-4 for the provided examples. For the examples, agent 1 has agent skills X and Y, agent 2 has agent skills Y and Z, agent 3 has agent skills Q and S, and agent 4 has agent skill R. An agent in the above example may refer to one or more agents having the associated skill(s).

The one or more forecasts may also include an average handle time (AHT) forecast. The AHT forecast indicates the average time to be taken by the agents to handle a user call. The AHT forecast may be based on the handle times of previous user calls, which may be included in the incoming call metrics.

Figure 3:
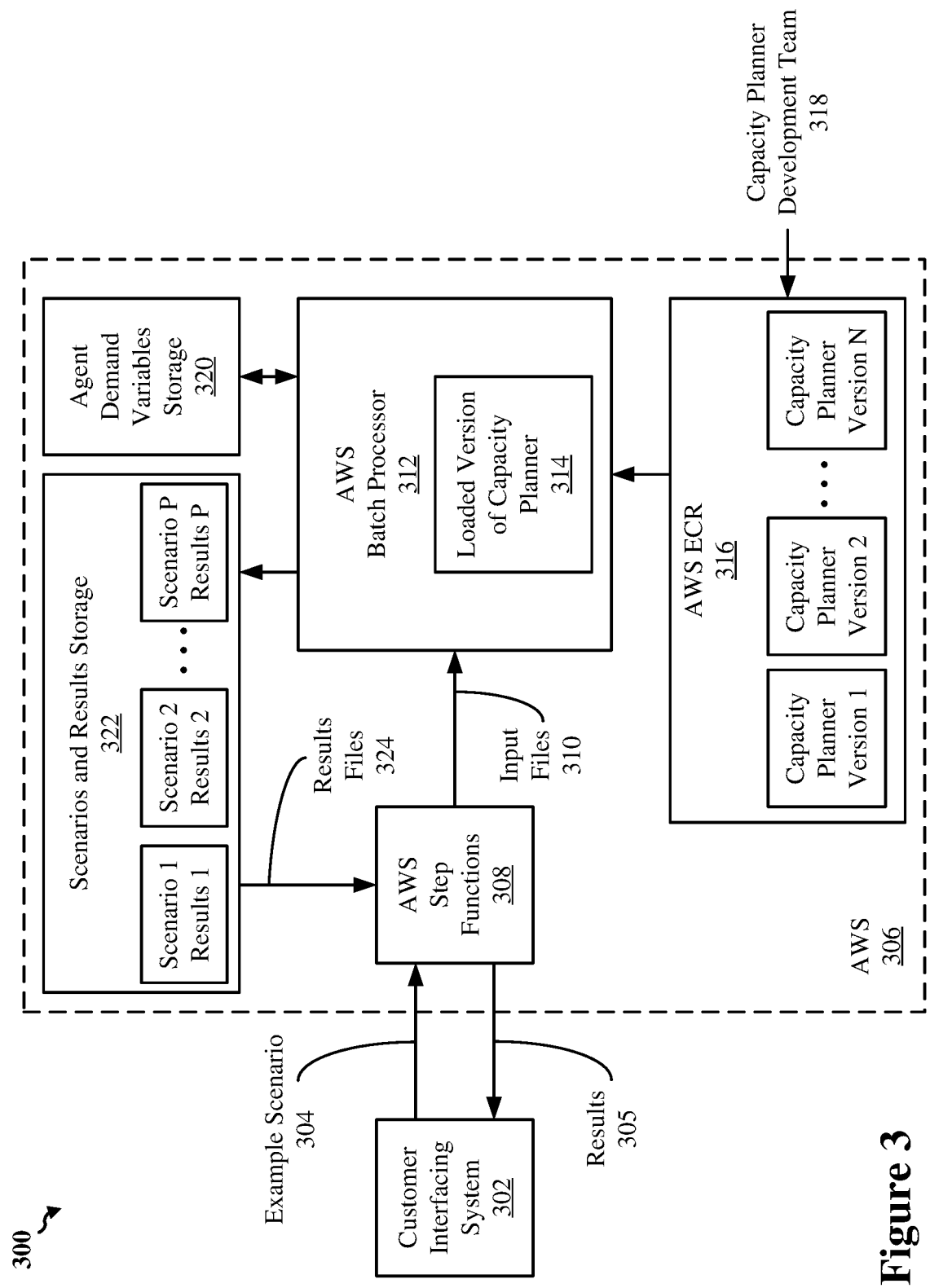
FIG. 3 shows a block diagram of example components for performing operations associated with agent demand forecasting and capacity planning.

In some implementations, the agent demand forecaster 250 is not included in the system 200. As such, the interface 210 may receive the one or more forecasts to be used to generate the agent supply decision by the capacity planner 240. In some implementations, the forecasts may be generated by a third party service or another system. For example, a customer interfacing system (such as an Anaplan® configured system or another customer interfacing software system) may be used to obtain the incoming call metrics and other data for a call center (such as the time period for which to generate a forecast or other information that may be needed to generate the forecast, the routing strategy, agent cost information, or other call center specific information). The customer interfacing system may implement the agent demand forecaster to generate the one or more forecasts from the obtained metrics and other data. The customer interfacing system may be coupled to a system implementing the capacity planner. For example, Amazon® Web Services (AWS) may be used to implement the capacity planner and interface with the customer interfacing system to receive the one or more forecasts and generate an agent supply decision. The agent supply decision may then be provided through the AWS to the customer interfacing system so that the agent supply decision may be provided to the customer. An example implementation of the components implementing the various portions of the system 200 is depicted in FIG. 3 and described in more detail with reference to FIG. 3.

Referring back to FIG. 2, the capacity planner 240 generates the agent supply decision, which is to be used by a call center operator to staff the agents needed for handling the predicted user calls. The agent supply decision is based on a plurality of agent demand variables. The agent demand variables may include one or more of the user call volume forecast, the AHT forecast, the defined user call routing strategy, one or more call center constraints, or cost information. Cost information may be a financial cost associated with a specific agent. For example, the cost information may include the salary and overhead associated with employing and utilizing the agent for the amount of time. In some implementations, the cost information may vary between agents. For example, salaries based on expertise and seniority, overhead based on different business departments, and other financial costs may vary across the agents. In some other implementations (and as depicted in the examples herein), the cost information may be a fixed cost associated with each agent. In this manner, each agent is treated as having the same cost in terms of solving the supply-demand problem to handle the predicted user calls. The call center constraints may include one or more of an average wait time by a user, a minimum number of agents to be employed, a maximum number of agents to be employed, an occupancy associated with an agent (such as the amount of time that the agent is to rest between handling user calls), or a minimum service level objective (SLO) requirement.

In some implementations, an SLO may be an internal business objective to be met by a call center that is part of the business. An example SLO may include a maximum AHT of five minutes, an average hold time of less than one minute, a minimum average customer satisfaction score, or other metric of the performance of the call center. Some SLOs may be used as minimum requirements to be met by the call center in generating the agent supply decision. In some other implementations, if a call center is contracted to handle user calls for another business or entity, a service level agreement (SLA) exists between the call center business and the entity contracting with the call center business. One or more SLOs may be indicated in the SLA, and such SLOs may be used as minimum requirements to be met by the call center in generating the agent supply decision.

The capacity planner 240 is configured to solve a constrained optimization problem to generate the agent supply decision. In some implementations, the constraints are the minimum SLO requirements and other call center constraints, and the variable to be optimized is the number of agents needed to meet the call center constraints for a defined time period. Another variable to be optimized may be the AHT. One or more other variables to be optimized may also exist, such as the SLOs themselves being increased to an optimal level with reference to call center resources required to meet the SLOs. The agent supply decision may include a solution to the routing problem of mapping forecasted user calls to agents by indicating the number of agents needed to meet the defined constraints for handling the forecasted user calls. As noted above, the agent supply decision may also include a staffing schedule (such as a daily staffing schedule), a seasonal staffing plan, a hiring plan to increase the number of available agents with specific skills, a capacity plan to increase the capacity of number of calls that may be handled by the call center, or other decisions to assist with the call center meeting its SLOs and other constraints. The examples herein limit describing the agent supply decision as including the number of agents (with specific skills) needed for the defined time period exclusively for clarity in describing aspects of the present disclosure.

While the capacity planner 240 and the agent demand forecaster 250 are depicted as separate components of the system 200 in FIG. 2, the components 240 and 250 may be a single component, may include additional components, may include software including instructions stored in memory 235 or the database 220, may include application specific hardware (e.g., one or more ASICs), or a combination of the above. As such, the particular architecture of the system 200 shown in FIG. 2 is but one example of a variety of different architectures within which aspects of the present disclosure may be implemented. For example, in other implementations, components of the system 200 may be distributed across multiple devices, may be included in fewer components, and so on. An example implementation of the system 200 is depicted in FIG. 3.

FIG. 3 shows a block diagram 300 of example components 302 and 304 for performing operations associated with agent demand forecasting and capacity planning. The customer interfacing system 302 implements the agent demand forecasting operations to generate the one or more forecasts.

As depicted, the customer interfacing system 302 generates an example scenario 304 including the one or more forecasts for a defined time period in the future. For example, the example scenario may indicate the user calls needing specific user skills that are predicted to be received and when the user calls are predicted to be received. The example scenario 304 also includes a desired time period, call center constraints, or other agent demand variables provided by the customer or to be used by the capacity planner. As used with reference to FIG. 3, a "customer" may refer to an entity associated with the call center that provides the required information to perform capacity planning and receiving the results generated by the capacity planner (such as a manager or other person of the call center). As noted above, the customer interfacing system 302 may be an Anaplan configured system. The customer interfacing system 302 may include a graphical user interface (GUI) to be used by the customer to provide the information needed by the capacity planner to generate the example scenario 304 and receive the results 305 from the AWS 306 (such as the agents that are indicated to be used for the example scenario 304).

The AWS includes the AWS Step Functions 308. The AWS Step Functions 308 is a visual workflow service to allow building a serverless application. In FIG. 3, the application is to perform capacity planning based on a current version of a capacity planner application. The AWS Step Functions 308 is configured to receive the example scenario 304 and convert the example scenario 304 into input files 310 to be used by the AWS Batch Processor 312 executing the loaded version of the capacity planner 314 to perform the capacity planning operations. The loaded version of the capacity planner 314 may come from the AWS Elastic Container Registry (ECR) 316. The AWS ECR 316 is a fully managed container registry to store a plurality of versions of the capacity planner (such as versions 1-N) from the Capacity Planner Development Team 318 (which may be one or more software developers) developing the capacity planner versions. For example, each time the capacity planner is updated by the development team 318, a user interface to the AWS ECR 316 may be used to upload the new version of the capacity planner. The newest version of the capacity planner may then be loaded from the AWS ECR 316 to the AWS Batch Processor 312.

As noted above, the example scenario 304 may include the agent demand variables. As such, the input files 310 may include one or more files including the agent demand variables. The agent demand variables may be stored in the agent demand variables storage 320, such as one or more JavaScript Object Notation (JSON) files. In this manner, the agent demand variables may be reused for different scenarios being processed by the AWS Batch Processor 312 executing the loaded version of the capacity planner 314. The AWS Batch Processor 312 is to solve the routing problem of which agents are needed to handle the example scenario 304 of user calls. The AWS Batch Processor 312 generates a result corresponding to the scenario 304 (such as the subset of available agents to be used for the scenario as the solution to the routing problem). The scenarios received and the corresponding results generated over time may be stored in the scenarios and results storage 322 (depicted as including scenario 1/results 1 to scenario P/results P as an example). The results may be stored as files to be used by the AWS Step Functions 308. The results files 324 associated with the example scenario 304 are obtained by the AWS Step Functions 308 from the Scenarios and Results Storage 322, and the results 305 associated with the example scenario 304 and the results files 324 are provided by the AWS Step Functions 308 to the customer interfacing system 302.

Regarding the agent demand variables, the input files 310 may include a plurality of JSON files, such as: "volume.json" to indicate the forecasted user call volume; "aht.json" to indicate the forecasted AHT; "routing.json" to indicate the routing strategy used by the call center; "constraints.json" to indicate one or more call center constraints (such as an average wait time, minimum number of agents, maximum number of agents, an occupancy, or a minimum SLO requirement); and "costs.json" to indicate an agent cost. Such JSON files may be stored in the Agent Demand Variables Storage 320. The Agent Demand Variables Storage 320 also may store one or more JSON files associated with values that are generated by the AWS Batch Processor 312 during execution of the loaded version of the capacity planner 314. For example, during multiple simulations of solving the routing problem for the example scenario 304, the capacity planning operations may generate and use one or more quality metrics associated with the simulations. A quality metric may be any metric that is measurable to indicate an effectiveness of a potential solution as compared to other solutions. For example, a quality metric may indicate the effectiveness of a first number of agents being used to solve problem as compared to a second number of agents being used. Example quality metrics include an average speed to answer (ASA) for user calls for the simulation of the example scenario 304, an SLO indicated in an SLA (such as whether the SLO is being met or a metric of the SLO for the simulation); and an occupancy associated with the combination of agents being used for the simulation (such as whether a defined occupancy is being met or a metric indicating the occupancy across the combination of agents). The quality metrics may also be stored as one or more JSON files in the Agent Demand Variables Storage 320. The example JSON files including the quality metrics may include: "slo.json" to indicate one or more SLOs (such as one or more SLO metrics) for the call center; "asa.json" to indicate an average speed to answer (ASA) for user calls; and an "efficiency.json" to indicate the occupancy. In some implementations, the JSON files are combined into a context file of a specific format to be used for the capacity planner, and the context file may be stored in storage 320.

Regarding the results files 324 that are received, stored, and output by the Scenarios and Results Storage 322, the results files 324 may include one or more JSON files, such as "headcount.json" to indicate the determined agents (which includes the number of agents) to be used for the example scenario 304 and "attribution.json" to indicate the allocation of user call volume and the corresponding AHT simulated for different portions of the determined agents. As described below, the AHT may be per forecast group of user calls to each staff group of agents (with the agents being segmented into different staff groups).

The following description is regarding the operation of the capacity planner (such as the capacity planner 240 in FIG. 2) to indicate a solution to a routing problem (with the solution including a number of agents to be used for a scenario, such as included in a "headcount.json"). The capacity planner is associated with optimizing call handling for a call center. In particular, the capacity planner generates a solution to a routing problem of forecasted user calls to agents by determining the number of agents with specific agent skills to be used for the forecasted user calls.

In solving the routing problem, a multi-skill routing solution is used to route the user calls to agents. The multi-skill routing solution will be described in a simplified manner for clarity, with six types of user calls with specific skill needs (such as from table 1 above) being routed to four types of agents having specific skills. It is to be understood that the routing solution may be thousands or more user calls being routed to hundreds or more agents over time.

Figure 4:
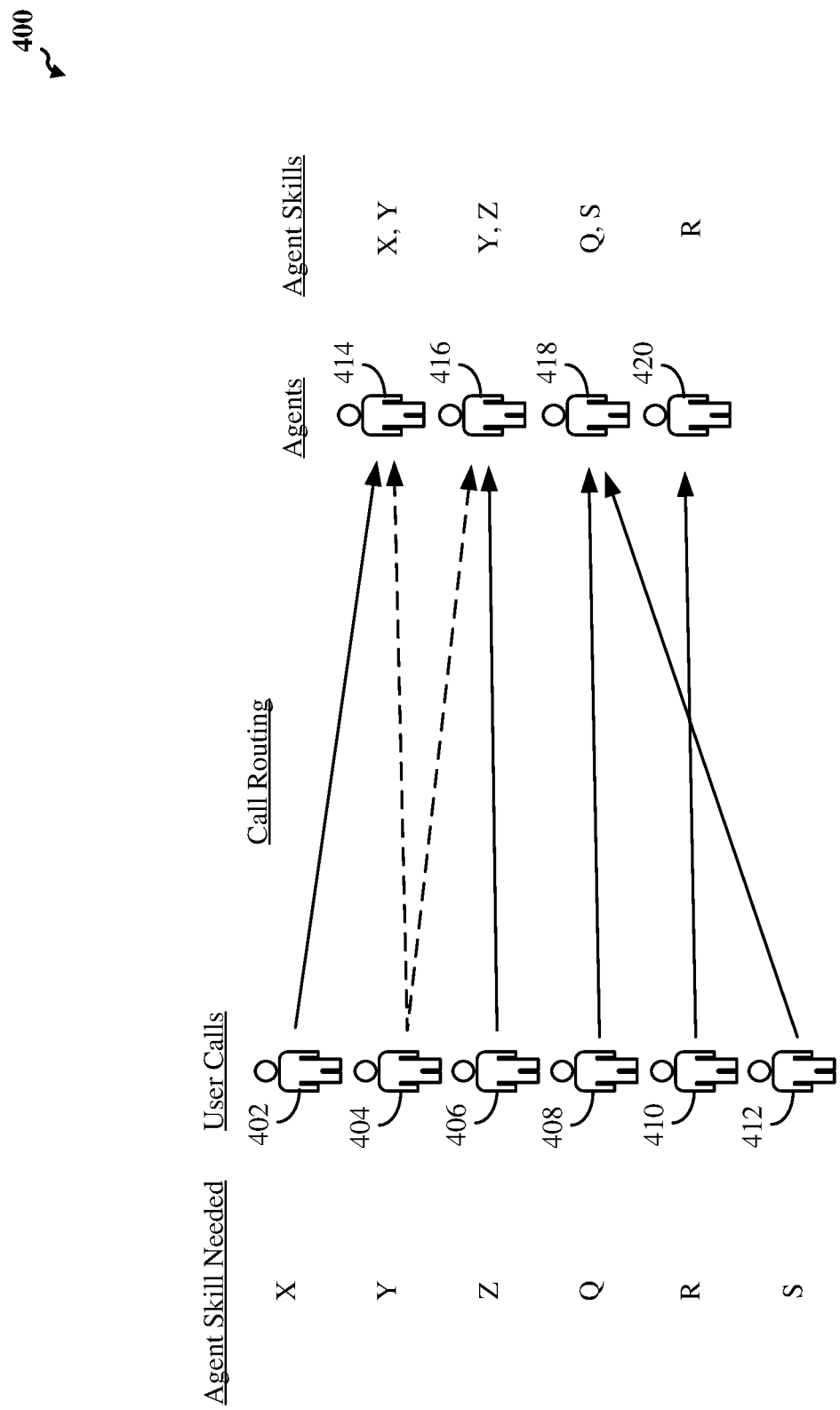
FIG. 4 depicts an example routing solution of routing user calls to agents.

FIG. 4 depicts an example routing solution 400 of routing user calls 402-412 to agents 414-420. As shown, user call 402 needs an agent with agent skill X (i.e., agent 414), user call 404 needs an agent with agent skill Y (i.e., either agent 414 or agent 416), user call 406 needs an agent with agent skill Z (i.e., agent 416), user call 408 needs an agent with agent skill Q (i.e., agent 418), user call 410 needs an agent with agent skill R (i.e., agent 420), and user call 412 needs an agent with agent skill S (i.e., agent 418). Some of the agents include multiple agent skills. For example, agent 414 includes agent skills X and Y. As such, agent 414 is capable of handling user calls 402 and 404. The dashed lines from user call 404 regarding call routing indicate that the user call may be directed to either agent 414 or agent 416. In one solution, user call 404 is routed to agent 414. In another solution, user call 404 is routed to agent 416.

If specific types of user calls are routed to a specific agent or group of agents with a specific skill as depicted in FIG. 4, then a simple solution to the agents needed is to determine the number of agents to handle an accumulation of a fixed cost of a single user call (such as AHT) over the total number of user calls of a specific type (such as requiring a specific agent skill). However, as noted above and depicted in FIG. 4, some agents may be associated with multiple skills such that a user call could be routed to different agents. As such, the routing problem becomes more complicated than determining a number of agents to cover a fixed cost of user calls. In addition, the agents 414-420 may be grouped into staff groups. For example, agents may be divided into subsets based on mutually exclusive sets of agent skills such that an agent exclusively falls into one of the staff groups. In practice regarding a call center, each agent is part of a staff group that is to handle specific types of user calls. The staff group may have needs and operations that differ from the other staff groups. As such, the one or more forecasts that are generated may be at the staff group level or at an even finer level than the staff group. As a result, the results from the capacity planner in providing a solution to the routing problem for the call center based on forecasts at or below the staff group level is more complicated than a single fixed cost problem in determining a number of agents to handle a number of predicted user calls. For example, there may exist forecast groups, which may be the same number as, less than, or more than the number of staff groups. A forecast group may be associated with a grouping of potential user calls for which a forecast (such as forecasted user call volume) is to be generated. To note, one or more forecast groups may correspond to a staff group and one or more staff groups may correspond to a forecast group. For example, referring to FIG. 4, the user calls 402-412 may represent the types of user calls (needing specific agent skills) that are to be received at the call center. The volume of user calls of the call types may be forecast in generating the one or more forecasts. The forecast groups may be based on the specific routing strategy for the call center, which may be based on specific business departments, queue flows, or any other suitable information to separate a total forecast for the call center into different forecast groups. The forecasts for the forecast groups may be based on the incoming call metrics. Such a routing setup including the forecast groups is depicted in FIG. 5.

Figure 5:
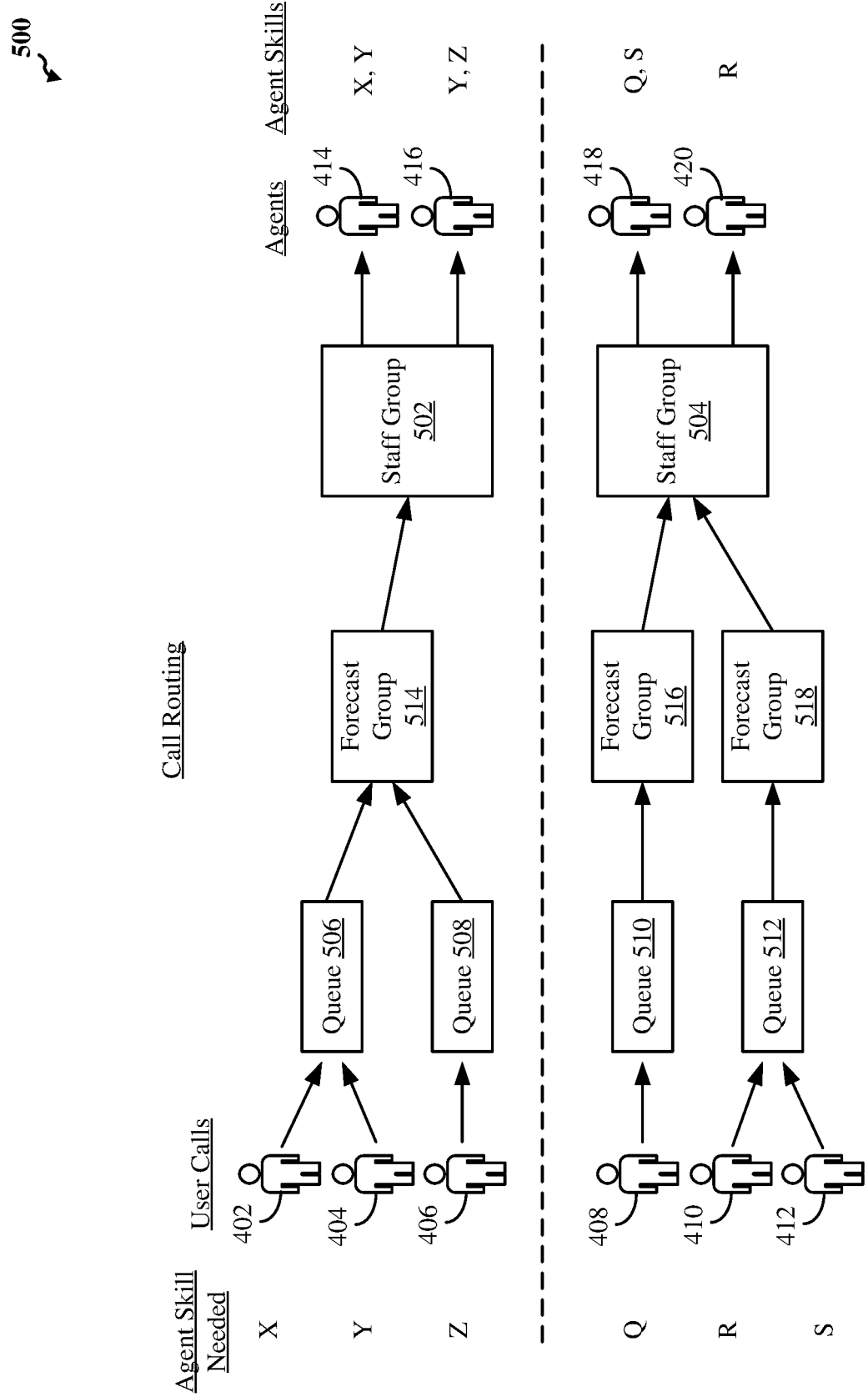
FIG. 5 depicts an example routing setup of routing user calls to agents grouped into different staff groups.

FIG. 5 depicts an example routing setup 500 of routing user calls 402-412 to agents 414-420 grouped into different staff groups 502 and 504. As shown, agent skills X, Y, and Z are segmented from agent skills Q, R, and S such that agents 414 and 416 are included in staff group 502 and agents 418 and 420 are included in staff group 504. To note, a staff group may be based on a specific business department or a completely different aspect of a company than other staff groups for which the call center is employed. The staff groups may be part of the routing strategy. As shown, user calls 402 and 404 are queued together in queue 506, user calls 406 are queued in queue 508, user calls 408 are queued in queue 510, and user calls 410 and 412 are queued together in queue 512. To note, the queues are first in first out.

Based on a multi-skill routing problem being solved, the user calls 402-412 may correspond to three separate forecast groups 514-518. Forecast group 514 includes user calls 402-406 from queues 506 and 508, forecast group 516 includes user calls 408 from queue 510, and forecast group 518 includes user calls 410-412 from queue 512. As noted above, the forecast groups are defined by the routing strategy. The one or more forecasts by the capacity planner may be for forecast groups 514-518 to indicate the call volume at each forecast group. The capacity planner is to identify the optimized group of agents to be used to handle the forecasts for the forecast groups 514-518. While FIG. 5 depicts each forecast group being associated with only one staff group (such that user calls are directed only to the associated staff group), a forecast group may be associated with multiple staff groups (such that user calls may be directed to one of a plurality of staff groups) and vice versa.

With the problem being solved by the capacity planner being described in general terms, formulation of the problem being solved is provided below in mathematical terms. The mathematical terms are used in implementing aspects of the capacity planner, whose operations are described in more detail below. The overall problem to be solved is provided in equation 1 below:

$$\text{given } X: \min_h(c(h|X)) \text{ subject to } g(h|X) < b \quad (1)$$

In equation 1, X is the input system state (including user call volume, AHT, routing strategy, and so on). For example, X may include the plurality of agent demand variables, the routing strategy, or other information regarding the call center of importance to solving equation 1. As noted in equation 1, the input system state X is provided. Control variable h is a vector of headcounts for each staff group. For example, if h is regarding the call routing setup in FIG. 5, h=[h1, h2] where h1 is the headcount for staff group 502 and h2 is the headcount for staff group 504. c(h|X) is the cost function associated with the given headcounts h for the given input system state X. As noted in equation 1, c(h|X) is to be minimized by varying h. To note, c(h|X) is a nonlinear cost function. In other words, varying h does not cause a linear adjustment to c(h|X). Also, minimizing c(h|X) is subject to nonlinear performance constraints g(h|X) (which is performance objective functions for each of the forecast groups) being less than constraint bounds b. b may be a vector of minimum SLOs required in an SLA to be met for the forecast groups. For example, if b is regarding the call routing setup in FIG. 5, b=[b1, b2, b3] where b1 is a minimum SLO requirement for forecast group 514, b2 is a minimum SLO requirement for forecast group 516, and b3 is a minimum SLO requirement for forecast group 518.

In some implementations, input system state X includes the following variables that are provided for the call center. Vector v=[v1, v2, . . . , vm] of user call volumes per forecast group, vector a=[a1, a2, . . . , am] of AHT per forecast group, routing strategy Rmn from m forecast groups to n staff groups, vector q=[q1, q2, . . . , qn] of agent shrinkage per staff group, and cost strategy Cmn (which may be defined as a fixed cost per agent or a variable cost per agent). In the examples herein for clarity, the cost of each agent is assumed to be fixed and the same across all agents. As such, determining the minimum of c(h|X) is based on a simple sum of agent costs across staff group. Minimizing cost may be based on minimizing the number of agents to be used for the routing problem. In some other implementations, the cost of an agent may be based on the staff group to which the agent belongs. As such, determining the minimum of c(h|X) is based on a weighted sum of agents for each staff group. In some other implementations, the cost of an agent may be independent from other agents. As such, minimizing total cost may not have a linear correlation to the number of agents to be used. In some implementations, the cost function may also capture other desires of the business. For example, the cost function may also include a measure of customer satisfaction (such as from surveys or other user indicated approval of service), agent utilization (such as down time), expected revenue, and so on. The business constraints g may include a maximum headcount for a staff group (such as based on call center size or other restrictions), a minimum headcount for a staff group, an occupancy maximum constraint for a staff group, an SLO constraint for a forecast group, and an ASA constraint for a forecast group. Regarding an occupancy constraint, the metric may indicate a maximum ratio of time spent handling user calls compared to a rest time between handling user calls. For example, 0.85 indicates that a maximum of 85 percent of the agent's time may be used to handle user calls. 15 percent of time is to be used to rest between user calls. Because of the complex relationship between some of the variables of the input system state X and the constraints g, some values of the constraints g are estimated (such as by stochastic simulation).

In some implementations, the capacity planner (such as a processor executing the capacity planner software) generates a plurality of solutions of headcount vector h to solve equation 1. A solution of h is said to be viable if all constraints g are satisfied. A viable solution of h is said to be optimal if the cost c associated with h (i.e., c(h|X)) is less than the other costs c associated with other viable solutions of h. Because of the sheer number of possible solutions for a large call center, enumerating all possible solutions to determine the optimal solution would consume too much time and processing resources. As such, some form of an artificial intelligence (AI) model based on optimization techniques is implemented in the capacity planner and used to determine an optimum headcount vector h. In some implementations, the capacity planner is to minimize cost while also maximizing certain performance metrics. For example, the capacity planner is configured to solve a lagrangian dual problem equivalent to the primal problem depicted in equation 1 above. The equivalent lagrangian dual problem indicates that the capacity planner is to minimize cost c while also maximizing values associated with constraints g (such as increasing an SLO, reducing an occupancy, and so on). The equivalent lagrangian dual problem to the primal problem of equation 1 is depicted in equation 2 below:

$$\text{given } X: \max_{a>0}(\min_h(c(h|X))+a[g(h|X)-b]) \quad (2)$$

As shown, equation 2 includes an inner minimization problem and an outer maximization problem. As noted above, a is the vector of AHT, which is based on the constraints g and constraint bounds b. The operation of the AI model of the capacity planner to solve such a problem is described in more detail below. In describing the capacity planner, FIG. 6 shows a flowchart depicting an example operation for performing capacity planning.

Figure 6:
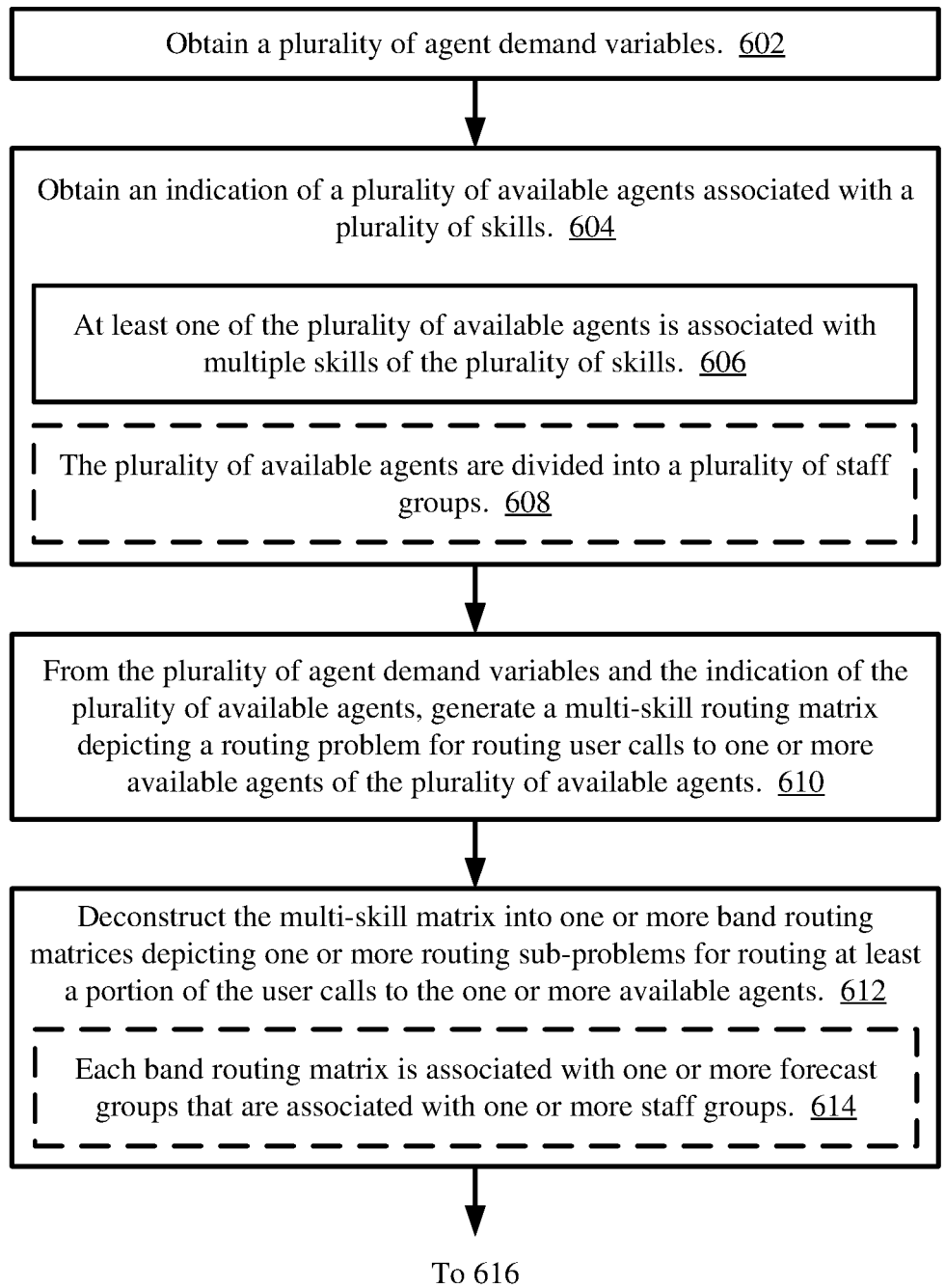
FIG. 6 shows an illustrative flow chart depicting an example operation for call handling optimization for a call center.
Figure 6:
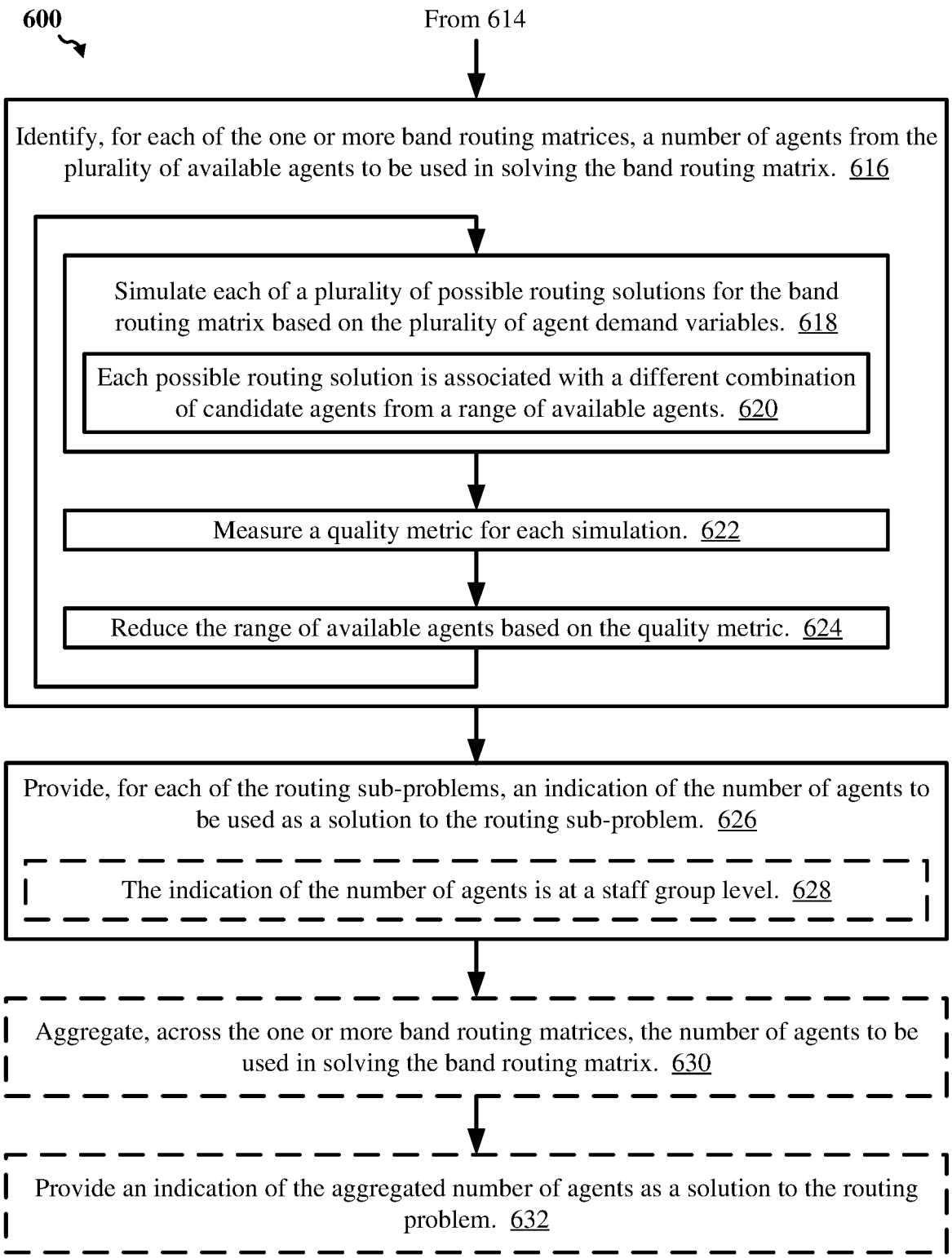

FIG. 6 shows an illustrative flow chart depicting an example operation 600 for call handling optimization for a call center. In particular, example operation 600 may be used to identify a headcount h associated with a forecast of call volume v and AHT a. The example operation 600 is described as being performed by components of the system 200 in Figure or components of the diagram 300 in FIG. 3.

At 602, the system 200 obtains a plurality of agent demand variables. The agent demand variables may include one or more of: a user call volume forecast; an AHT forecast, a defined user call routing strategy; one or more call center constraints; or cost information. As used herein, cost information is the cost associated with utilizing an agent (such as a financial cost per hour or other suitable unit of cost). In some implementations, the cost information includes a fixed cost associated with each agent. As used herein, the call center constraints may include any specific constraints that are to be met during operation of the call center. The call center constraints may include the constraints g described above. In some implementations, the one or more call center constraints include one or more of: an average wait time (such as the amount of time a user waits on average before being helped by an agent); a minimum number of agents (which may be at the call center level or at a staff group level); a maximum number of agents (which may be at the call center level or at a staff group level); an occupancy associated with an agent; or a minimum SLO requirement. While the AHT forecast is depicted as being a potential agent demand variable, in some implementations, the AHT may be forecasted as a quality metric to be used in generating a solution (such as an AHT for each forecast group associated with one or more staff groups). As such, the agent demand variables are not a rigid list of variables to be used in all circumstances.

In some implementations, the interface 210 obtains the agent demand variables. For example, the AWS Step Functions 308 may obtain the agent demand variables in the example scenario 304 from the customer interfacing system 302, and the agent demand variables may be provided in the input files 310 to the AWS Batch Processor 312. In some implementations, at least a portion of the agent demand variables are stored in a database 220 and retrieved when to be used by the capacity planner 240. For example, at least a portion of the agent demand variables may be stored in storage 320 and retrieved by the AWS Batch Processor 312 when to be used in executing the loaded version of the capacity planner 314. For example, the minimum and maximum number of agents, specific SLO requirements based on an SLA, or other agent demand variables may be constant over time and may be reused. As such, such agent demand variables may be stored instead of being passed from a customer interfacing system 302 for each scenario 304.

At 604, the system 200 obtains an indication of a plurality of available agents associated with a plurality of skills. For example, an availability list or timetable of agents indicating which agents can be used for the scenario 304 may be provided by the customer interfacing system 302 to the AWS Step Functions 308, which is then provided to the AWS Batch Processor 312. At least one of the plurality of available agents is associated with multiple skills of the plurality of skills (606). For example, as depicted in FIGS. 4 and 5, an agent may be associated with more than one agent skill to be able to assist with different types of user calls. As used below, a "skill" refers to an agent skill as described herein.

In some implementations, the plurality of agents may be divided into a plurality of staff groups (608). The staff groups may be based on any suitable division of skills, such as for different business departments, for different areas of a call center (to allow agents with similar skill to sit together), and so on. As noted above, the staff groups may be organized such that each skill is mutually exclusive to one staff group. If the agents are divided into a plurality of staff groups, solving a multi-skill routing matrix associated with the routing problem of routing forecasted user calls to the agents is based on the staff groups.

Steps 610-626 may be performed by the capacity planner 240. For example, the AWS Batch Processor 312 executing the loaded version of the capacity planner 314 may execute operations 610-626 to generate a solution to the routing problem associated with scenario 304. At 610, the system 200 generates, from the plurality of agent demand variables and the indication of the plurality of available agents, a multi-skill routing matrix depicting a routing problem for routing user calls to one or more available agents of the plurality of available agents. To note, each user call is associated with a skill of the plurality of skills. As depicted in equations 1 and 2, the routing problem is to be solved by reducing cost (and optionally maximizing certain constraint metrics as depicted in equation 2) by varying the number of agents to be used. The routing problem may be depicted as a multi-skill routing matrix to allow for easier computer manipulation of the problem. "Multi-skill" may refer to one or more agents including a plurality of skills or being associated with a staff group that includes agents having a plurality of skills. Generating the multi-skill routing matrix is described in more detail below with reference to a simplified example of four forecast groups being mapped to three staff groups. As noted above, the specific forecast groups and staff groups may be indicated in the routing strategy. The multi-skill routing matrix includes one dimension of forecast groups and another dimension of staff groups. For example, the staff groups may be aligned on the vertical axis, and the forecast groups may be aligned on the horizontal axis.

Figures 7, 8:
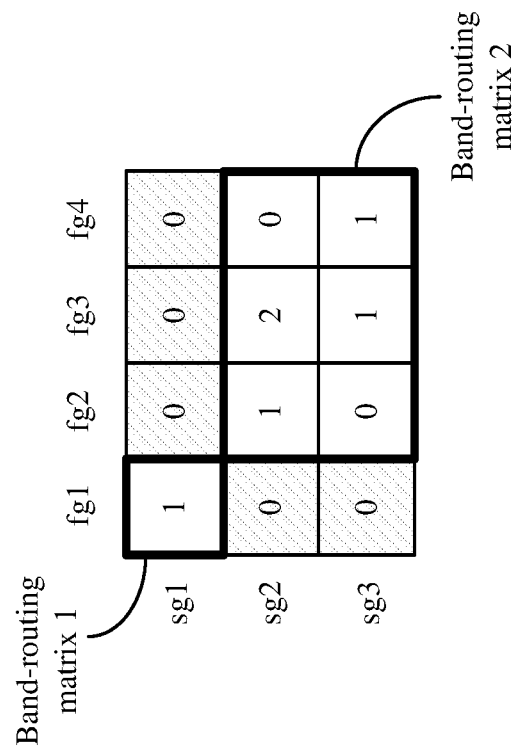
FIG. 7 depicts an example multi-skill routing matrix depicting an example routing problem.
FIG. 8 depicts an example reorganized routing matrix for the multi-skill routing matrix of FIG. 7.

FIG. 7 depicts an example multi-skill routing matrix 700 depicting an example routing problem. The routing problem is to route user calls from four forecast groups fg1-fg4 to three staff groups sg1-sg3 of agents. To note, the forecasts for each forecast group may include a forecasted user call volume for the forecast group. In addition, a forecast group may be associated with one or more staff groups, and a staff group may be associated with one or more forecast groups.

The values in the multi-skill routing matrix 700 indicate a priority of user calls from the forecast group to the staff group. A zero value indicates that the forecast group is not associated with the staff group. For example, forecast group fg1 is not associated with staff groups sg1 and sg3. In this manner, user calls from fg1 are not routed to agents in sg1 or sg3. A non-zero value indicates that the forecast group is associated with the staff group. For example, fg1 is associated with sg2. In this manner, user calls from fg1 are routed to agents in sg2. The different non-zero values may indicate the priority of a forecast group with reference to other forecast groups associated with the same staff group. For example, fg4 and fg1 are associated with sg2, but fg4 (with a value of 2) has a higher priority than fg1 (with a value of 1). In this manner, user calls from fg4 are prioritized over user calls from fg1 such that user calls from fg4 may jump positions in a queue over user calls from fg1.

Referring back to FIG. 6, at 612, the system 200 deconstructs the multi-skill routing matrix into one or more band routing matrices depicting one or more routing sub-problems for routing at least a portion of the user calls to the one or more available agents. In some implementations, each band routing matrix is associated with one or more forecast groups that are associated with one or more staff groups (614). For example, referring back to FIG. 7, the multi-skill routing matrix 700 may be broken down into multiple band routing matrices.

To deconstruct the multi-skill routing matrix 700 into the multiple band routing matrices, the system 200 searches the multi-skill routing matrix 700 for the vertex of minimum degree of non-zero values and reorganizes the multi-skill routing matrix 700 based on the vertex of minimum degree. To identify the vertex of minimum degree, the system 200 identifies the non-zero value with the minimum number of other non-zero values on the same column and on the same row. For example, the value of 1 at entry row sg3/column fg3 is not accompanied with other non-zero values on row sg3 and column fg3. Conceptually to reorganize the multi-skill matrix, the rows and columns may be reorganized to place the matrix entry at a corner of the multi-skill matrix (such as the top-left corner). The multi-skill matrix may be reorganized such that the non-zero values existing with an entry on the same row and column increases while traversing along the vertex to the opposite corner of the reorganized matrix. One or more rectangles of the reorganized matrix are associated with a band routing matrix for a routing sub-problem of the overall routing problem. In this manner, the overall routing problem may be broken into smaller sub-problems. In some implementations, a Reverse Cuthill-McKee (RCM) algorithm is used to deconstruct the multi-skill matrix into a plurality of band routing matrices.

FIG. 8 depicts an example reorganized routing matrix 800 for the multi-skill routing matrix 700 of FIG. 7. As shown, the reorganized routing matrix 800 includes band routing matrix 1 associated with a routing sub-problem 1 and band routing matrix 2 associated with a routing sub-problem 2 of the multi-skill routing matrix 700. The band routing matrices begin on the vertex of the reorganized matrix 800 and are rectangular in shape. The shaded 0 value rectangles indicate no user calls are routed between the associated forecast groups and staff groups. As such, the shaded 0 value rectangles are not included in the sub-problems.

For the routing sub-problems, each routing sub-problem corresponds to one of: a one to one (1-1) mapping of forecast groups to staff groups (such as routing sub-problem 1 in FIG. 8); a multiple to one (multi-1) mapping of forecast groups to staff groups; a one to multiple (1-multi) mapping of forecast groups to staff groups; or a multiple to multiple (multi-multi) mapping of forecast groups to staff groups (such as routing sub-problem 2 in FIG. 8).

Referring back to FIG. 6, at 616, the system 200 identifies, for each of the one or more band routing matrices, a number of agents from the plurality of available agents to be used in solving the band routing matrix. For example, for each of the routing sub-problems, the system 200 (such as the AI model of the capacity planner 240) is to solve the sub-problem to identify an optimum number of agents to be used in the staff groups for the routing sub-problem. As such, the number of agents being solved for may be at the staff group level for the call center.

In general, solving a band routing matrix to identify a number of agents in step 616 includes recursively performing steps 618-624 for each band routing matrix to converge the range of available agents for the routing sub-problem to a specific number of agents to be used in solving the band routing matrix. At 618, the system 200 simulates each of a plurality of possible routing solutions for the band routing matrix based on the plurality of agent demand variables. Each possible routing solution is associated with a different combination of candidate agents from a range of available agents (620). For example, referring back to equations 1 and 2, h is to be adjusted to minimize the cost c, and each possible routing solution is associated with a different h. At 622, the system 200 measures a quality metric for each simulation. A quality metric may include one or more of: an ASA for user calls; an SLO indicated in an SLA; or an occupancy associated with the combination of candidate agents for the possible routing solution. At 624, the system 200 reduces the range of available agents based on the quality metric.

At 626, the system 200 provides for each of the routing sub-problems, an indication of the number of agents to be used as a solution to the routing sub-problem. In some implementations, the indication of the number of agents is at a staff group level (628). In this manner, the system 200 may indicate the number of agents needed for each staff group of the call center.

To note, the solution to the overall routing problem may be the number of agents identified for each routing sub-problem or an aggregation of the various numbers of agents. In some implementations, the system 200 may aggregate, across the one or more band routing matrices, the number of agents to be used in solving the band routing matrix (630), and the system 200 may provide an indication of the aggregated number of agents as a solution to the routing problem (632). The aggregated number may be provided in addition to the numbers identified in step 616 (such as at the staff group level). In some implementations, the overall solution to the routing problem includes an indication of the number of agents for each staff group of the call center. While not depicted in FIG. 6, the system 200 may also assign a group of agents for a time period based on the overall solution to the routing problem (such as assigning a specific group of agents to work based on the number of agents identified to be used for each routing sub-problem). For example, the system 200 may generate an employment schedule for an upcoming time period, or the system 200 may automatically notify the agents when they are to work or to which groups they are to be assigned.

In performing the example operation 600, the system 200 expands the singular routing problem into multiple sub-problems and identifies multiple possible solutions for each of the multiple sub-problems in further expansion. The system 200 also is configured to reduce all of the possible solutions across the multiple sub-problems into a solution for the routing problem (such as indicating the number of agents to be used for each staff group).

Figure 9:
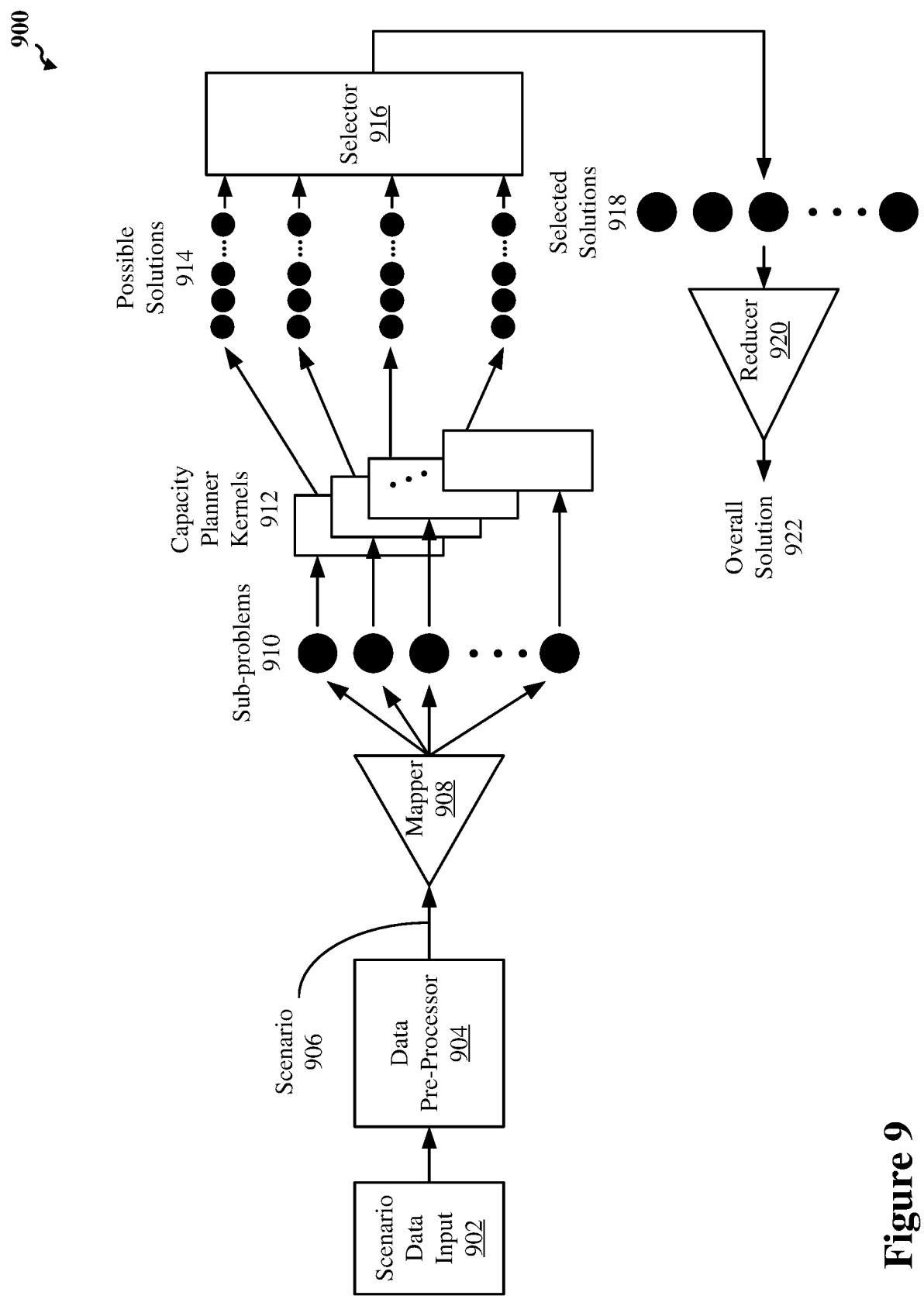
FIG. 9 depicts an example data flow diagram of performing capacity planning.

FIG. 9 depicts an example data flow diagram 900 of performing capacity planning. The data flow diagram 900 indicates a general architecture for performing the operations of capacity planning from receiving a scenario to providing a solution to the scenario. The scenario data input 902 may be the input of raw scenario data associated with the call center. For example, raw data from an Anaplan system or another suitable customer interfacing system is served to the capacity planner (such as system 200 or the AWS Batch Processor 312 executing the capacity planner 314) via an application programming interface (API) of the capacity planner. The data pre-processor 904 of the capacity planner pre-processes the raw input data for use by the capacity planner. For example, the data pre-processor 904 ensures that the raw input data is of the correct computer-readable format, is consistent, is correctly aligned or formatted, includes necessary default values, and so on. The pre-processed data may be referred to as a scenario 906 associated with the overall routing problem. The scenario 906 is provided to the mapper 908, which generates a plurality of sub-problems 910 to be solved by the capacity planner in solving the overall routing problem. The mapper 908 is configured to generate sub-problems that are independent in a combination of time (such as for a specific time-interval, also referred to as an interval) and space (such as for a specific routing subset of user calls from the routing strategy). In this manner, each sub-problem 910 may be a single-interval staffing problem for one specific mapping of one or more forecast groups to staff groups, and each sub-problem for the space may be defined using one or more of: user call volume (also referred to as demand volume); AHT; the routing matrix or policy (such as the band routing matrix associated with the problem); a service level target to be met; an ASA target to be met; headcount constraints; occupancy constraints; or cost information. In some implementations, the mapper 908 generates the multi-skill matrix and subsequent band routing matrices. Each sub-problem 910 may be associated with a specific interval and correspond to a specific band routing matrix of the multi-skill matrix.

With the plurality of sub-problems 910 that are independent of each other in time and space, the capacity planner may be started for each sub-problem 910 such that a unique capacity planner kernel 912 exists for each sub-problem 910. For example, AWS Batch Processor 312 may process each sub-problem 910 such that a kernel of the capacity planner 314 exists for each sub-problem 910. For each kernel, a plurality of possible solutions 914 for the corresponding sub-problem 910 are generated. Each possible solution 914 may be an indication of the number of agents to be used for the corresponding sub-problem (such as a headcount for one or more staff groups). The selector 916 selects one of the possible solutions 914 for each sub-problem 910 (such as through recursive simulation of one or more quality metrics and convergence towards a specific number of agents based on the quality metrics, which is described in more detail below) to identify the selected solutions 918. The reducer 920 collects the selected solutions 918 and combines them to generate an overall solution 922. To note, the selected solution 918 maybe collected asynchronously. In some implementations, the overall solution 922 may include an indication of the number of agents (such as in a "headcount.json" file). For example, the file may include an indication of the headcount for each staff group. The overall solution 922 may also include an indication of the allocation of user call volume or AHT per forecast group to each staff group (such as in an "attributions.json" file) and an indication of the SLO and ASA based on the number of agents indicated (such as in a "performance.json" file). The one or more files of the overall solution 922 may be included in the results files 324 and stored in a storage 322. In some implementations, the overall solution (and/or selected solutions to the sub-problems) may be provided via the API of the capacity planner.

Referring back to step 616 of FIG. 6, identifying a number of agents as a solution to a band routing matrix may correspond to solving the sub-problems 910 associated with the specific band routing matrix for different time intervals. Identifying a number of agents as a solution to a band routing matrix for each of the one or more band routing matrices includes adjusting the number of agents to identify a plurality of possible solutions that are viable and determining which of the viable solutions is optimal. As noted above, a band routing matrix may be a 1-1 matrix, a multi-1 matrix, a 1-multi matrix, or a multi-multi matrix. Simulating and solving a band routing matrix to identify a number of agents in step 616 may be based on the specific type of band routing matrix. How the AI model of the capacity planner may solve each type of band routing matrix is described in more detail below.

As shown in steps 618-624 in FIG. 6, solving a sub-problem includes recursively performing simulation and optimization until a solution of the number of agents is converged to by the capacity planner. In some implementations, the simulation portion ("simulator") may differ based on the type of band routing matrix, and the optimization portion ("optimizer") may be similar across the different types of band routing matrices.

Regarding the simulator, many of the constraints (and possibly the objective function) are complicated nonlinear functions of the input system state X and the proposed headcount h. In some implementations, in order to compute the constraints to identify possible solutions that are viable (and the viable solution that is optimal), the system 200 may build a model based on stochastic simulation to simulate what would happen based on certain assumptions regarding the constraints in order to measure the performance. For example, a user call arrival rate may be mapped to a specific distribution, an agent rest time may be mapped to a specific distribution, a user call handle time may be mapped to a specific distribution, and an answer time may be mapped to a specific distribution based on previous incoming call metrics. The distributions (which may be any suitable distribution, such as a poisson distribution) may be used in the model for simulation to convert a headcount h and an input system state X into one or more quality metrics (such as an observed SLO or an observed ASA for a simulation).

Figure 10:
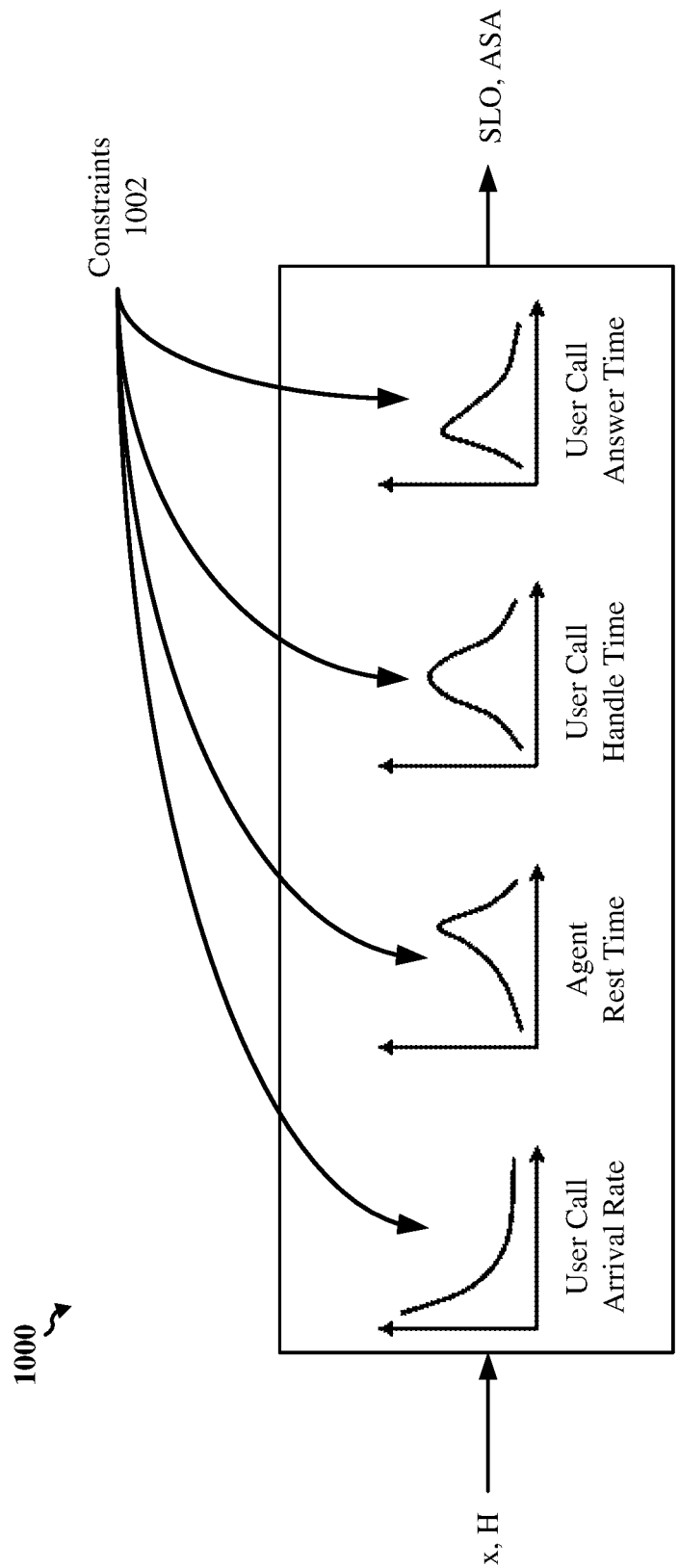
FIG. 10 depicts an example model based on stochastic simulation for a plurality of constraints.

FIG. 10 depicts an example model 1000 based on stochastic simulation for the constraints 1002. The model 1000 is to generate, from the input h and X and based on the distributions of the constraints 1002, quality metrics SLO and ASA. As noted herein, an SLO may be any suitable objective indicated in an SLA or determined by the business or entity employing the call center. The model 1000 may indicate the randomness of the constraints, as many of the states and transitions of the constraints are uncertain. As such, simulation of the distributions multiple times for a headcount h may be used to model the randomness of the constraints (depicted as the distributions of the constraints 1002) and to determine a statistical convergence of the constraints to cause an output of the quality metrics. The specific configuration of a model 1000 may be based on the specific type of band routing matrix being solved.

A 1-1 band routing matrix may be treated as a classic state space model since one forecast group feeds to one staff group. The state space model may be of the number of user calls in the system based on assumptions of user call arrival, service time for the user calls, and abandonment of user calls. For call centers, such a classic state space model may be solved by the capacity planner by applying an Erlang-C function to the distribution of the user calls at the call center to generate the quality metrics (such as an SLO or ASA).

For a multi-1 band routing matrix, user calls from a plurality of forecast groups are provided to one staff group. As such, a state space model may be generated based on separate classic state space models if each forecast group was part of a 1-1 mapping to the same staff group. In other words, the distribution of user calls for each forecast group are combined together to generate an overall distribution of user calls for the overall state space model. For a call center, the distribution of user calls at a forecast group is a poisson distribution when simulated over a large enough plurality of instances. Combining a plurality of poisson distributions (such as combining together the data points of multiple distributions to generate a single distribution) generates a poisson distribution. As such, for a possible routing solution for a multi-1 band routing matrix, the capacity planner may generate a combined poisson distribution of user calls based on a combination of poisson distributions associated with the multiple forecast groups of user calls and apply an Erlang-C function to the combined poisson distribution to generate a quality metric (such as one or more of an SLO or an ASA).

For a 1-multi band routing matrix, user calls from one forecast group is provided to multiple staff groups. For a multi-multi band routing matrix, user calls from multiple forecast groups are provided to multiple staff groups. In some implementations, the capacity planner performs Monte Carlo simulations for possible solutions (such as different headcounts h) for the 1-multi band routing matrix or the multi-multi band routing matrix to generate a quality metric for the possible routing solution. The Monte Carlo simulation may include repeatedly modelling the arrival and propagation of a single user call through a call center model. The modelling may be based on random sampling event distribution and measuring choice metrics associated with the constraints 1002 of the model 1000. Through enough repeated simulation of user call events by the capacity planner, the capacity planner is able to determine a quality metric based on an estimated convergence of the distributions of the quality metrics.

Figure 11:
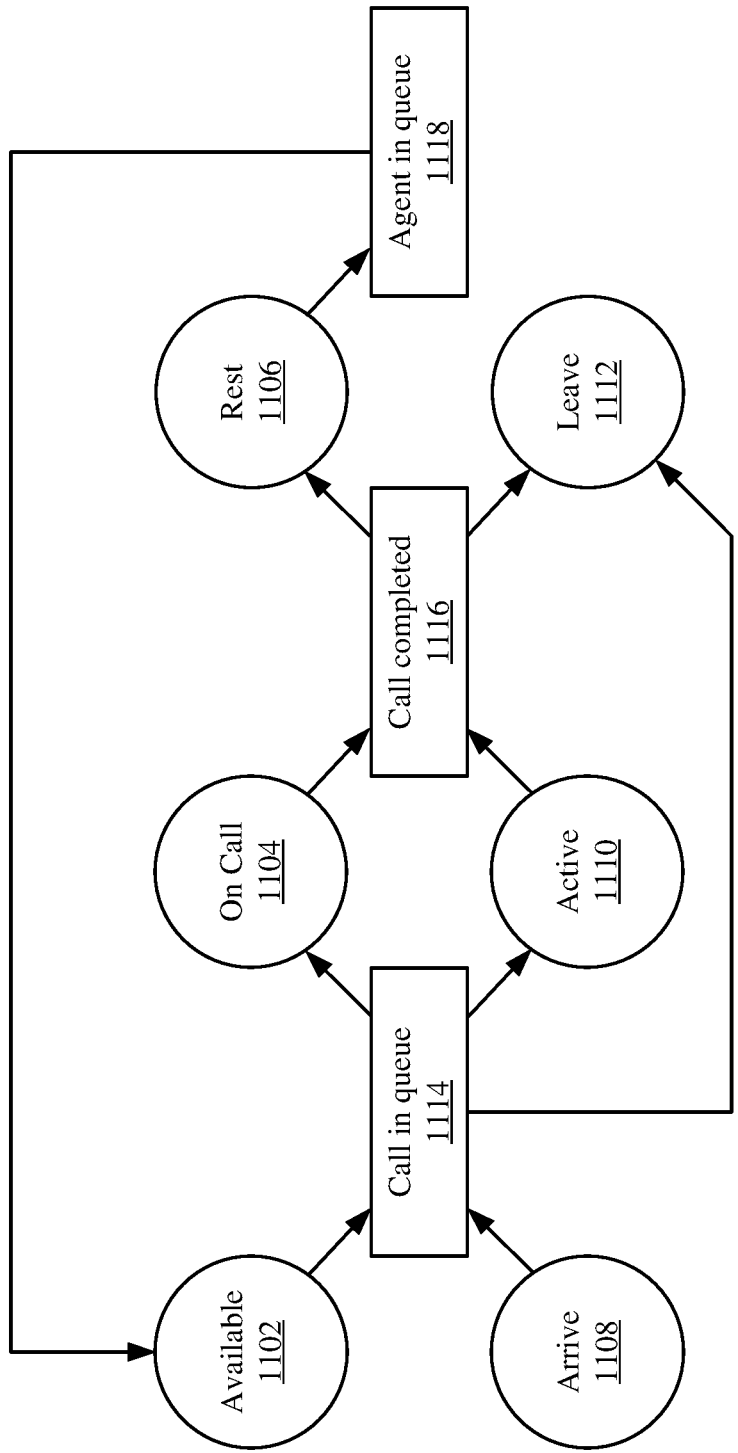
FIG. 11 depicts an example user call flow used to model user calls associated with a 1-multi or multi-multi band routing matrix.

FIG. 11 depicts an example user call flow 1100 used to model user calls associated with the 1-multi or multi-multi band routing matrix. The user call flow 1100 includes agent states 1102-1106 and user call states 1108-1112. As state 1108, a user call arrives to the call center. The call is placed into a queue (1114) by the call center for an agent to answer the call. An available agent from agent state 1102 retrieves the user call from the queue to assist the user. At such time, the agent is on the call at state 1104, and the user call is in an active state 1110. Once the call is completed (1116), the agent enters a rest state 1106, and the user call leaves at state 1112. As noted above, the agent may remain in the rest state 1106 a required amount of time before being available again (such as based on a maximum occupancy). After resting the agent is placed into queue (1118) to be made available again in the available state 1102. To note, some users may hang up before being helped by an agent (while the user call is in queue (1114). As such, the Monte Carlo simulation also models the attrition of calls in queue as part of the calls reaching an end state 1112 of leaving the call center. Such is based on an attrition rate, which may be one or more agent demand variables or other information provided by the customer for generating a solution to a scenario. Through modelling call flows many times (such as thousands or more times), an overall SLO, ASA, or other quality metric may be estimated across the plurality of iterations for the specific band routing matrix.

As noted herein, a forecast group may be configured to provide user calls to more than one staff group. In some implementations, to which agent or staff group a user call is to be directed from a forecast group is indicated in the routing strategy. For example, the scenario to be solved by the capacity planner may be based on a priority routing model for which each forecast group associated with more than one staff group is associated with a priority of the staff groups to handle user calls from the forecast group. For example, referring back to FIG. 7, forecast group fg4 is associated with staff groups sg1 and sg2 such that user calls from fg4 may be routed to either sg1 or sg2. As shown, sg2 has a higher priority than sg1 for fg4. For different priority staff groups for a forecast group, the call center is to attempt to route an incoming user call to a staff group based on the priority. In this manner, the call center is to attempt to route calls to sg2 before routing calls to sg1 if allowed. The routing strategy may indicate various constraints regarding prioritized routing, such as when to switch between different priority staff groups for routing based on the availability of agents at the staff groups, should a user call be placed on hold for an amount of time to be routed to a higher priority staff group, and so on. In this manner, the user call flow being modelled may be as realistic as possible to how user calls are handled at the call center.

As described above, through simulation, the capacity planner measures or otherwise estimates a quality metric for each simulation (with a batch of Monte Carlo simulations for a specific possible solution representing a single simulation). Through optimization, the capacity planner is also to converge to a single solution for each band routing matrix from the plurality of possible solutions. As noted above, a solution may include an indication of the number of agents to be used (a headcount), which may be at the staff group level.

Regarding step 624 in FIG. 6, reducing the range of available agents based on the quality metric measured by the capacity planner includes using a golden-section search operation based on the quality metric to converge to an optimum number of agents. Converging to an optimum solution (a specific number of agents) is based on a value associated with each possible solution. If the capacity planner is to solve equation 1 above (minimizing cost), the value of each possible solution is the cost associated with the solution. To note, each possible solution is associated with a total cost, such as a fixed cost per agent times number of agents. In this manner, the quality metric may be used to ensure that the possible solution is viable (meeting certain constraints). If not viable, the possible solution may be removed by the capacity planner from optimization. If the capacity planner is to solve equation 2 or another combination of quality metrics and cost, the value of each possible solution is the output of the equation indicating the defined value (such as a combination of the cost and the quality metrics).

The number of possible solutions prevents a straightforward search for a minimum cost or a desired value. As such, a searching algorithm is used by the capacity planner to speed to process of identifying an optimum solution. For example, if the values associated with the possible solutions are graphed with respect to the number of agents, the curve of values to number of agents is a convex curve with an inflection point (also referred to as a root). A searching algorithm, such as a golden-section search, is used to converge to the root indicating the optimum number of agents without comparing every single result. While the golden-section search is described as being used, any suitable bisection method or other searching method may be used to identify the optimum solution for the band routing matrix.

The golden-section search is a bisection method of bisecting the possible solutions into two groups of possible solutions based on two ranges of headcount. The golden ratio is 0.618 such that the range of headcount is segmented into a first segment of the first approximately 61.8 percent of headcount and a second segment of the of the last approximately 39.2 percent of headcount. The capacity planner compares a value of a possible solution segmented into the first segment to a value of a possible solution segmented into the second segment to determine which value is closer to the root (such as which value is smaller if the root is a minimum value). In this manner, the capacity planner determines which segment includes the root (the optimum number of agents). The capacity planner disregards the possible solutions in the segment not including the root. In this manner, the range of available agents is the range for the segment including the root.

Using the new range of available agents, the capacity planner may again perform simulations for the band routing matrix (using different headcounts h within the new range of available agents) and measuring a quality metric for each simulation. The golden-section search operation may again be used to further reduce the range of available agents. Such operations may be repeated until an answer is converged upon. In some implementations, the answer of the number of agents to be used may be an answer selected from a segment after defined number of iterations or otherwise after the golden-section search is to stop. For example, the capacity planner may set a fixed time limit, a fixed number of iterations, a minimum headcount range, or other means to exit further narrowing the range of available agents to a single possible solution. In this manner, converging to a number of agents to be used may include the capacity planner selecting (such as randomly selecting or otherwise selecting) a possible solution in the remaining segment as the optimum solution of the number of agents to be used.

As described above, a system including an AI model (such as a capacity planner to perform Monte Carlo simulation, stochastic simulation modelling, Erlang-C operations, routing problem modelling, and so on) is described to optimize the resources of a call center. For example, the system may indicate the number of agents to be used (such as per staff group and/or an overall number of agents) and attributions associated with the number of agents for a scenario of user calls simulated for the call center based on various agent demand variables, such as call center constraints or the routing strategy for the call center. The indication may be used by the system, a person, or another system to generate a list of agents to work specific shifts, seasonal staffing plans, or other necessities of staffing the call center to meet the SLOs required of the call center.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or C" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for call handling optimization using an artificial intelligence (AI) model, comprising:
   obtaining a plurality of agent demand variables;
   obtaining an indication of a plurality of available agents associated with a plurality of skills, wherein at least one of the plurality of available agents is associated with multiple skills of the plurality of skills;
   from the plurality of agent demand variables and the indication of the plurality of available agents, generating a multi-skill routing matrix depicting a routing problem for routing user calls to one or more available agents of the plurality of available agents, wherein each user call is associated with a skill of the plurality of skills;
   deconstructing the multi-skill routing matrix into one or more band routing matrices depicting one or more routing sub-problems for routing at least a portion of the user calls to the one or more available agents;
   identifying, for each of the one or more band routing matrices, a number of agents from the plurality of available agents to be used in solving the band routing matrix, comprising recursively:
      simulating each of a plurality of possible routing solutions for the band routing matrix based on the plurality of agent demand variables, wherein each possible routing solution is associated with a different combination of candidate agents from a range of available agents;
      measuring a quality metric for each simulation; and
      reducing the range of available agents based on the quality metric until the range of available agents converges to a number of agents to be used in solving the band routing matrix; and
   providing, for each of the routing sub-problems, an indication of the number of agents to be used as a solution to the routing sub-problem.

2. The method of claim 1, further comprising:
   aggregating, across the one or more band routing matrices, the number of agents to be used in solving the band routing matrix; and
   providing an indication of the aggregated number of agents as a solution to the routing problem.

3. The method of claim 1, wherein the one or more band routing matrices includes one or more of:
   a multiple of forecast groups for user calls to a single staff group of agents (multi-1) band routing matrix; or
   a multiple of forecast groups for user calls to multiple staff groups of agents (multi-multi) band routing matrix.

4. The method of claim 3, wherein simulating each of a plurality of possible routing solutions for the multi-1 band routing matrix includes, for a possible routing solution for the multi-1 band routing matrix:
   generating a combined poisson distribution of user calls based on a combination of poisson distributions associated with the multiple forecast groups of user calls; and
   applying an Erlang-C function to the combined poisson distribution to generate the quality metric.

5. The method of claim 3, wherein simulating each of a plurality of possible routing solutions for the multi-multi band routing matrix includes performing a Monte Carlo simulation for a possible routing solution for the multi-multi band routing matrix to generate the quality metric for the possible routing solution.

6. The method of claim 1, wherein reducing the range of available agents based on the quality metric includes using a golden-section search operation based on the quality metric to converge to an optimum number of agents.

7. The method of claim 1, wherein the quality metric includes one or more of:
   an average speed to answer (ASA) for user calls;
   a service level objective (SLO) indicated in a service level agreement (SLA); or
   an occupancy associated with the combination of candidate agents.

8. The method of claim 1, wherein the plurality of agent demand variables include one or more of:
   a user call volume forecast;
   an average handle time (AHT) forecast;
   a defined user call routing strategy;
   one or more call center constraints; or
   cost information.

9. The method of claim 8, wherein the one or more call center constraints includes one or more of:
   an average wait time;
   a minimum number of agents;
   a maximum number of agents;
   an occupancy associated with an agent; or
   a minimum service level objective (SLO) requirement.

10. The method of claim 1, further comprising assigning a group of agents from the plurality of available agents for a time period based on the number of agents identified for each of the one or more band routing matrices.

11. A system for call handling optimization using an artificial intelligence (AI) model, the system comprising:
    one or more processors; and
    a memory storing instructions that, when executed by the one or more processors, causes the system to perform operations comprising:
       obtaining a plurality of agent demand variables;
       obtaining an indication of a plurality of available agents associated with a plurality of skills, wherein at least one of the plurality of available agents is associated with multiple skills of the plurality of skills;
       from the plurality of agent demand variables and the indication of the plurality of available agents, generating a multi-skill routing matrix depicting a routing problem for routing user calls to one or more available agents of the plurality of available agents, wherein each user call is associated with a skill of the plurality of skills;
       deconstructing the multi-skill routing matrix into one or more band routing matrices depicting one or more routing sub-problems for routing at least a portion of the user calls to the one or more available agents;
       identifying, for each of the one or more band routing matrices, a number of agents from the plurality of available agents to be used in solving the band routing matrix, comprising recursively:
          simulating each of a plurality of possible routing solutions for the band routing matrix based on the plurality of agent demand variables, wherein each possible routing solution is associated with a different combination of candidate agents from a range of available agents;

measuring a quality metric for each simulation; and
reducing the range of available agents based on the quality metric until the range of available agents converges to a number of agents to be used in solving the band routing matrix; and
providing, for each of the routing sub-problems, an indication of the number of agents to be used as a solution to the routing sub-problem.

12. The system of claim 11, wherein the operations further comprise:
aggregating, across the one or more band routing matrices, the number of agents to be used in solving the band routing matrix; and
providing an indication of the aggregated number of agents as a solution to the routing problem.

13. The system of claim 11, wherein the one or more band routing matrices includes one or more of:
a multiple of forecast groups for user calls to a single staff group of agents (multi-1) band routing matrix; or
a multiple of forecast groups for user calls to multiple staff groups of agents (multi-multi) band routing matrix.

14. The system of claim 13, wherein simulating each of a plurality of possible routing solutions for the multi-1 band routing matrix includes, for a possible routing solution for the multi-1 band routing matrix:
generating a combined poisson distribution of user calls based on a combination of poisson distributions associated with the multiple forecast groups of user calls; and
applying an Erlang-C function to the combined poisson distribution to generate the quality metric.

15. The system of claim 13, wherein simulating each of a plurality of possible routing solutions for the multi-multi band routing matrix includes performing a Monte Carlo simulation for a possible routing solution for the multi-multi band routing matrix to generate the quality metric for the possible routing solution.

16. The system of claim 11, wherein reducing the range of available agents based on the quality metric includes using a golden-section search operation based on the quality metric to converge to an optimum number of agents.

17. The system of claim 11, wherein the quality metric includes one or more of:
an average speed to answer (ASA) for user calls;
a service level objective (SLO) indicated in a service level agreement (SLA); or
an occupancy associated with the combination of candidate agents.

18. The system of claim 11, wherein the plurality of agent demand variables include one or more of:
a user call volume forecast;
an average handle time (AHT) forecast;
a defined user call routing strategy;
one or more call center constraints; or
cost information.

19. The system of claim 18, wherein the one or more call center constraints includes one or more of:
an average wait time;
a minimum number of agents;
a maximum number of agents;
an occupancy associated with an agent; or
a minimum service level objective (SLO) requirement.

20. The system of claim 11, wherein the operations further comprise:
assigning a group of agents from the plurality of available agents for a time period based on the number of agents identified for each of the one or more band routing matrices.

* * * * *